United States Patent
Cai

(10) Patent No.: US 12,348,661 B2
(45) Date of Patent: Jul. 1, 2025

(54) CROSS-DEVICE COMMUNICATIONS METHOD AND APPARATUS, DEVICE, AND STORAGE MEDIUM

(71) Applicant: HUAWEI TECHNOLOGIES CO., LTD., Shenzhen (CN)

(72) Inventor: Shuanglin Cai, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 581 days.

(21) Appl. No.: 17/639,769

(22) PCT Filed: Sep. 4, 2020

(86) PCT No.: PCT/CN2020/113407
§ 371 (c)(1),
(2) Date: Mar. 2, 2022

(87) PCT Pub. No.: WO2021/043244
PCT Pub. Date: Mar. 11, 2021

(65) Prior Publication Data
US 2022/0294889 A1 Sep. 15, 2022

(30) Foreign Application Priority Data
Sep. 5, 2019 (CN) .......................... 201910837298.4

(51) Int. Cl.
*H04M 1/60* (2006.01)
*H04M 3/42* (2006.01)

(52) U.S. Cl.
CPC ..... *H04M 1/6041* (2013.01); *H04M 3/42102* (2013.01)

(58) Field of Classification Search
CPC ........... H04M 1/6041; H04M 3/42102; H04M 3/543; H04M 3/42263; H04L 65/1046; H04L 65/1069
(Continued)

(56) References Cited

U.S. PATENT DOCUMENTS 11,044,360 B1* 6/2021 Judge ................ H04M 3/42348
2014/0141834 A1 5/2014 Kim
(Continued)

FOREIGN PATENT DOCUMENTS

CN 1909646 A 2/2007
CN 101888377 A 11/2010
(Continued)

OTHER PUBLICATIONS

Request for Comments: 3261, J. Rosenberg et al., SIP: Session Initiation Protocol, Network Working Group, Jun. 2002, XP015009039; 270 total pages.

*Primary Examiner* — Marcos Batista
(74) *Attorney, Agent, or Firm* — Rimon PC

(57) ABSTRACT

A network device receives a call request of a calling party, where the call request includes identification information of a called first terminal device; calls the first terminal device and at least one second terminal device based on the identification information of the first terminal device, where identification information of the second terminal device and the first terminal device has a correspondence with a same user account; receives an answering instruction of a user, where the answering instruction is used to instruct a third terminal device in the first terminal device and the at least one second terminal device to answer the call request; and sends a call response to the calling party in response to the answering instruction.

19 Claims, 11 Drawing Sheets

(58) Field of Classification Search
USPC .................................... 455/569.1; 370/338
See application file for complete search history.

(56) References Cited

U.S. PATENT DOCUMENTS

| | | | | |
|---|---|---|---|---|
| 2014/0274008 A1* | 9/2014 | Olodort | ............... | H04M 19/08 455/417 |
| 2016/0344867 A1 | 11/2016 | Krishnaswamy et al. | | |
| 2018/0227789 A1 | 8/2018 | Kothapalli et al. | | |

FOREIGN PATENT DOCUMENTS

| | | | |
|---|---|---|---|
| CN | 102843336 | A | 12/2012 |
| CN | 103905660 | A | 7/2014 |
| CN | 104937586 | A | 9/2015 |
| CN | 105934935 | A | 9/2016 |
| CN | 106657645 | A | 5/2017 |
| CN | 107493451 | A | 12/2017 |
| CN | 108965623 | A | 12/2018 |
| CN | 109040493 | A | 12/2018 |
| CN | 109120802 | A | 1/2019 |
| CN | 109286920 | A | 1/2019 |
| CN | 109348074 | A | 2/2019 |
| CN | 110177368 | A | 8/2019 |
| CN | 110719371 | A | 1/2020 |
| JP | 2007068119 | A | 3/2007 |
| WO | 2014170754 | A2 | 10/2014 |

\* cited by examiner

CROSS-DEVICE COMMUNICATIONS METHOD AND APPARATUS, DEVICE, AND STORAGE MEDIUM

CROSS REFERENCE TO RELATED APPLICATIONS

This application is a national stage of International Application No. PCT/CN2020/113407, filed on Sep. 4, 2020, which claims priority to Chinese Patent Application No. 201910837298.4, filed on Sep. 5, 2019. Both of the aforementioned applications are hereby incorporated by reference in their entireties.

TECHNICAL FIELD

This application relates to the field of communications technologies, and in particular, to a cross-device communications method and apparatus, a device, and a storage medium.

BACKGROUND

With popularization and development of intelligent terminal devices, a user expects to flexibly switch between different terminal devices to answer an incoming call, to greatly improve user experience. For example, at home, the user wants to use a smart speaker instead of a mobile phone to answer a call, so as to solve a problem that the mobile phone occupies two hands and has a poor far-field sound pickup capability.

Currently, a method for answering an incoming call across devices is implemented by using a voice transmission technology that is based on a Bluetooth hands-free profile (HFP) protocol. For example, when there is an incoming call on the mobile phone, the user controls the speaker to answer the incoming call. A specific process is as follows: A Bluetooth connection is first established between the mobile phone and the speaker; and when the incoming call is answered by the mobile phone, answering audio on the mobile phone is sent, by using the HFP protocol, to the speaker for playing. When the user hangs up, the user enters a hang-up instruction for controlling hang-up to the speaker, the speaker sends the hang-up instruction to the mobile phone by using the HFP protocol, and the mobile phone finally hangs up the call.

It can be learned from the foregoing descriptions that, in the conventional technology, a Bluetooth chip needs to be disposed on the terminal device, and costs of the Bluetooth chip are relatively high. In addition, when the user has a plurality of terminal devices, the user cannot freely select a convenient terminal device to answer an incoming call, and user experience is poor.

SUMMARY

Embodiments of this application provide a cross-device communications method and apparatus, a device, and a storage medium.

According to a first aspect, an embodiment of this application provides a cross-device communications method, applied to a network device. The method includes:

The network device receives a call request of a calling party, where the call request includes identification information of a called first terminal device; calls the first terminal device and at least one second terminal device based on the identification information of the first terminal device, where identification information of the second terminal device and the first terminal device has a correspondence with a same user account; then receives an answering instruction of a user, where the answering instruction is used to instruct a third terminal device to answer the call request, and the third terminal device is any one of the first terminal device and the at least one second terminal device; and sends a call response to the calling party in response to the answering instruction, where the call response is used to indicate the third terminal device to establish communication with the calling party.

In other words, the network device in this embodiment of this application may simultaneously call the first terminal device and the second terminal device that are under the same user account, and the user may select, based on an actual requirement, the first terminal device or the second terminal device to answer the call request of the calling party. This helps the user quickly transfer and answer the call, thereby improving user experience. In addition, Bluetooth chips do not need to be disposed on the first terminal device and the second terminal device, so that device costs are further reduced.

Optionally, the answering instruction is voice information, or the answering instruction is a preset user gesture instruction.

In a specific example, that the network device calls the first terminal device and at least one second terminal device based on the identification information of the first terminal device includes: The network device obtains, based on the identification information of the first terminal device, the at least one second terminal device under the user account corresponding to the identification information of the first terminal device; and then, the network device sends a call instruction to the first terminal device and the at least one second terminal device, where the call instruction is used to call the first terminal device and the at least one second terminal device.

In some examples, when calling the first terminal device and the at least one second terminal device, the network device may control the first terminal device to ring, and control the at least one second terminal device not to ring, so that the called user can learn the terminal device called by the calling party.

A manner in which the network device controls the first terminal device to ring may include: The network device sends a first call instruction to the first terminal device, where the first call instruction includes first ringing indication information, and the first ringing indication information is used to indicate the first terminal device to ring when the first terminal device is called.

A manner in which the network device controls the at least one second terminal device not to ring may include: The network device sends a second call instruction to the at least one second terminal device, where the second call instruction includes second ringing indication information, and the second ringing indication information is used to indicate the at least one second terminal device not to ring when the at least one second terminal device is called.

In some examples, the network device may further send a hang-up indication to a terminal device other than the third terminal device in the first terminal device and the at least one second terminal device, where the hang-up indication indicates the terminal device to hang up a call of the network device.

In some examples, the network device may further determine, based on a call function of the third terminal device, an answering manner in which the third terminal device answers the call request; and control the third terminal device to answer the call request in the determined answering manner, to ensure that the third terminal device successfully answers a call of the calling party.

Optionally, in this example, the call response sent by the network device to the calling party may include the answering manner in which the third terminal device answers the call request. In this way, when obtaining the answering manner of the third terminal device, the calling party may adjust a call manner of the calling party, to ensure successful communication with the third terminal device.

In some specific examples, a call function of the calling party is supporting a voice call and a video call. In this case, that the network device determines, based on a call function of the third terminal device, an answering manner in which the third terminal device answers the call request includes: if a call manner of the call request is a video call, and the call function of the third terminal device is supporting a voice call and a video call, determining that the answering manner of the third terminal device is a voice call or a video call; if a call manner of the call request is a video call, and the call function of the third terminal device is supporting a voice call but not supporting a video call, determining that the answering manner of the third terminal device is a voice call; if a call manner of the call request is a voice call, and the call function of the third terminal device is supporting a voice call and a video call, determining that the answering manner of the third terminal device is a voice call or a video call; or if a call manner of the call request is a voice call, and the call function of the third terminal device is supporting a voice call but not supporting a video call, determining that the answering manner of the third terminal device is a voice call.

In some examples, the network device may further determine a call manner between the third terminal device and the calling party based on a call manner of the call request and the answering manner of the third terminal device; and add the call manner between the third terminal device and the calling party to the call response to send the call manner to the calling party.

In some specific examples, that the network device determines a call manner between the third terminal device and the calling party based on a call manner of the call request and the answering manner of the third terminal device may include: if the call manner of the call request is a video call, and the answering manner of the third terminal device is a voice call, determining that the third terminal device communicates with the calling party in a voice call manner; if the call manner of the call request is a video call, and the answering manner of the third terminal device is a video call, determining that the third terminal device communicates with the calling party in a video call manner; if the call manner of the call request is a video call, and the answering manner of the third terminal device is a voice call, determining that the third terminal device communicates with the calling party in a voice call manner, and the calling party communicates with the third terminal device in a video call manner; if the call manner of the call request is a voice call, and the answering manner of the third terminal device is a voice call, determining that the third terminal device communicates with the calling party in a voice call manner; if the call manner of the call request is a voice call, and the answering manner of the third terminal device is a video call, determining that the third terminal device communicates with the calling party in a video call manner; or if the call manner of the call request is a voice call, and the answering manner of the third terminal device is a video call, determining that the third terminal device communicates with the calling party in a video call manner, and the calling party communicates with the third terminal device in a voice call manner.

According to a second aspect, an embodiment of this application provides a cross-device communications method, applied to a calling party. The method includes:

The calling party sends a call request, where the call request includes identification information of a called first terminal device; and receives a call response, where the call response is used to indicate the calling party to establish communication with a third terminal device, the third terminal device is any one of the first terminal device and at least one second terminal device, and identification information of the first terminal device and the second terminal device has a correspondence with a same user account.

In some examples, the call response further includes an answering manner in which the third terminal device answers the call request. In this case, the calling party may further select, based on the answering manner of the third terminal device, a call manner consistent with the answering manner to communicate with the third terminal device. In other words, the call manner of the calling party is consistent with the answering manner of the third terminal device.

Optionally, the answering manner is a voice call or a video call.

In some examples, the call request includes a call manner in which the calling party calls the first terminal device. In this case, the calling party may further select, based on the call manner, a call manner consistent with the call manner to communicate with the third terminal device. In other words, the call manner of the calling party may be consistent with an answering manner of the third terminal device, or may be inconsistent with the answering manner of the third terminal device.

In some examples, the call response includes a call manner between the third terminal device and the calling party, and the calling party may further communicate with the third terminal device based on the call manner carried in the call response.

In some specific examples, the following several call manners between the third terminal device and the calling party are included:

If a call manner of the call request is a video call, and an answering manner of the third terminal device is a voice call, the third terminal device communicates with the calling party in a voice call manner;

if a call manner of the call request is a video call, and an answering manner of the third terminal device is a video call, the third terminal device communicates with the calling party in a video call manner;

if a call manner of the call request is a video call, and an answering manner of the third terminal device is a voice call, the third terminal device communicates with the calling party in a voice call manner, and the calling party communicates with the third terminal device in a video call manner;

if a call manner of the call request is a voice call, and an answering manner of the third terminal device is a voice call, the third terminal device communicates with the calling party in a voice call manner;

if a call manner of the call request is a voice call, and an answering manner of the third terminal device is a video call, the third terminal device communicates with the calling party in a video call manner; or if a call manner of the call request is a voice call, and an answering manner of the third terminal device is a video call, the third terminal device communicates with the calling party in a video call manner, and the calling party communicates with the third terminal device in a voice call manner.

According to a third aspect, an embodiment of this application provides a cross-device communications apparatus, used in a network device and including:

a transceiver unit, configured to receive a call request of a calling party, where the call request includes identification information of a called first terminal device; and a processing unit, configured to call the first terminal device and at least one second terminal device based on the identification information of the first terminal device, where identification information of the first terminal device and the second terminal device has a correspondence with a same user account.

The transceiver unit is further configured to: receive an answering instruction of a user, where the answering instruction is used to instruct a third terminal device to answer the call request, and the third terminal device is any one of the first terminal device and the at least one second terminal device; and send a call response to the calling party in response to the answering instruction, where the call response is used to indicate the third terminal device to establish communication with the calling party.

In a specific example, the processing unit is specifically configured to obtain, based on the identification information of the first terminal device, the at least one second terminal device under the user account corresponding to the identification information of the first terminal device; and the transceiver unit is further configured to send a call instruction to the first terminal device and the at least one second terminal device, where the call instruction is used to call the first terminal device and the at least one second terminal device.

In some examples, the processing unit is further configured to control the first terminal device to ring and the at least one second terminal device not to ring.

In a specific example, the processing unit is specifically configured to control the transceiver unit to send a first call instruction to the first terminal device, where the first call instruction includes first ringing indication information, and the first ringing indication information is used to indicate the first terminal device to ring when the first terminal device is called.

In a specific example, the processing unit is specifically configured to control the transceiver unit to send a second call instruction to the at least one second terminal device, where the second call instruction includes second ringing indication information, and the second ringing indication information is used to indicate the at least one second terminal device not to ring when the at least one second terminal device is called.

In some examples, the transceiver unit is further configured to send a hang-up indication to a terminal device other than the third terminal device in the first terminal device and the at least one second terminal device, where the hang-up indication indicates the terminal device to hang up a call of the network device.

In some examples, the processing unit is further configured to: determine, based on a call function of the third terminal device, an answering manner in which the third terminal device answers the call request; and control the third terminal device to answer the call request in the determined answering manner.

Optionally, the call response includes the answering manner in which the third terminal device answers the call request.

In a specific example, a call function of the calling party is supporting a voice call and a video call. In this case, the processing unit is specifically configured to: if a call manner of the call request is a video call, and the call function of the third terminal device is supporting a voice call and a video call, determine that the answering manner of the third terminal device is a voice call or a video call; if a call manner of the call request is a video call, and the call function of the third terminal device is supporting a voice call but not supporting a video call, determine that the answering manner of the third terminal device is a voice call; if a call manner of the call request is a voice call, and the call function of the third terminal device is supporting a voice call and a video call, determine that the answering manner of the third terminal device is a voice call or a video call; or if a call manner of the call request is a voice call, and the call function of the third terminal device is supporting a voice call but not supporting a video call, determine that the answering manner of the third terminal device is a voice call.

In some examples, the processing unit is further configured to determine a call manner between the third terminal device and the calling party based on the call manner of the call request and the answering manner of the third terminal device. The call response includes the call manner between the third terminal device and the calling party.

In some specific examples of these examples, the processing unit is specifically configured to: if the call manner of the call request is a video call, and the answering manner of the third terminal device is a voice call, determine that the third terminal device communicates with the calling party in a voice call manner; if the call manner of the call request is a video call, and the answering manner of the third terminal device is a video call, determine that the third terminal device communicates with the calling party in a video call manner; if the call manner of the call request is a video call, and the answering manner of the third terminal device is a voice call, determine that the third terminal device communicates with the calling party in a voice call manner, and the calling party communicates with the third terminal device in a video call manner; if the call manner of the call request is a voice call, and the answering manner of the third terminal device is a voice call, determine that the third terminal device communicates with the calling party in a voice call manner; if the call manner of the call request is a voice call, and the answering manner of the third terminal device is a video call, determine that the third terminal device communicates with the calling party in a video call manner; or if the call manner of the call request is a voice call, and the answering manner of the third terminal device is a video call, determine that the third terminal device communicates with the calling party in a video call manner, and the calling party communicates with the third terminal device in a voice call manner.

Optionally, the answering instruction is voice information, or the answering instruction is a preset user gesture instruction.

According to a fourth aspect, an embodiment of this application provides a cross-device communications apparatus, used by a calling party and including:

a receiving unit, configured to: send a call request, where the call request includes identification information of a called first terminal device; and receive a call response, where the call response is used to indicate the calling party to establish communication with a third terminal device, the third terminal device is any one of the first terminal device and at least one second terminal device, and identification information of the first terminal device and the second terminal device has a correspondence with a same user account.

In some examples, a call function of the calling party is supporting a voice call and a video call, the call response further includes an answering manner in which the third terminal device answers the call request, and the apparatus further includes:

a processing unit, configured to select, based on the answering manner of the third terminal device, a call manner consistent with the answering manner to communicate with the third terminal device.

Optionally, the answering manner is a voice call or a video call.

In some examples, the call request includes a call manner in which the calling party calls the first terminal device, and the processing unit is further configured to select, based on the call manner, a call manner consistent with the call manner to communicate with the third terminal device.

In some examples, the call response includes a call manner between the third terminal device and the calling party, and the processing unit is further configured to communicate with the third terminal device based on the call manner carried in the call response.

In some specific examples, the following several call manners between the calling party and the third terminal device are included: If a call manner of the call request is a video call, and the answering manner of the third terminal device is a voice call, the third terminal device communicates with the calling party in a voice call manner; if a call manner of the call request is a video call, and the answering manner of the third terminal device is a video call, the third terminal device communicates with the calling party in a video call manner; if a call manner of the call request is a video call, and the answering manner of the third terminal device is a voice call, the third terminal device communicates with the calling party in a voice call manner, and the calling party communicates with the third terminal device in a video call manner; if a call manner of the call request is a voice call, and the answering manner of the third terminal device is a voice call, the third terminal device communicates with the calling party in a voice call manner; if a call manner of the call request is a voice call, and the answering manner of the third terminal device is a video call, the third terminal device communicates with the calling party in a video call manner; or if a call manner of the call request is a voice call, and the answering manner of the third terminal device is a video call, the third terminal device communicates with the calling party in a video call manner, and the calling party communicates with the third terminal device in a voice call manner.

According to a fifth aspect, an embodiment of this application provides a communications device, including a processor and a transceiver. The processor and the transceiver are configured to perform the cross-device communications method according to the first aspect or the second aspect.

According to a sixth aspect, an embodiment of this application provides a computer storage medium. The storage medium includes computer instructions, and when the instructions are executed by a computer, the computer is enabled to implement the cross-device communications methods according to the first aspect and the second aspect.

According to a seventh aspect, an embodiment of this application provides a computer program product. The program product includes a computer program, and the computer program is stored in a readable storage medium. A network device or a calling party device may read the computer program from the readable storage medium, and executes the computer program to enable the network device or the calling party to implement the foregoing cross-device communications method.

According to the cross-device communications method and apparatus, the device, and the storage medium provided in the embodiments of this application, a network device receives a call request of a calling party, where the call request includes identification information of a called first terminal device; calls the first terminal device and at least one second terminal device based on the identification information of the first terminal device, where identification information of the second terminal device and the first terminal device has a correspondence with a same user account; then receives an answering instruction of a user, where the answering instruction is used to instruct a third terminal device to answer the call request, and the third terminal device is any one of the first terminal device and the at least one second terminal device; and sends a call response to the calling party in response to the answering instruction, where the call response is used to indicate the third terminal device to establish communication with the calling party. In other words, the network device in this embodiment of this application may simultaneously call the first terminal device and the second terminal device that are under the same user account, and the user may select, based on an actual requirement, the first terminal device or the second terminal device to answer the call request of the calling party. This helps the user quickly transfer and answer the call, thereby improving user experience. In addition, Bluetooth chips do not need to be disposed on the first terminal device and the second terminal device, so that device costs are further reduced.

DESCRIPTION OF EMBODIMENTS

The following describes the technical solutions in the embodiments of this application with reference to the accompanying drawings in the embodiments of this application.

For ease of understanding the embodiments of this application, related concepts in the embodiments of this application are first briefly described as follows:

A Bluetooth hands-free profile (HFP) protocol is formulated to implement Bluetooth calls, and implemented functions are related to the Bluetooth calls. Almost all Bluetooth headsets and vehicle-mounted Bluetooth support the HFP protocol, and all existing smartphones also support this protocol.

Voice over Internet protocol (VoIP) is to compress and encapsulate an analog voice signal and transmit the voice signal in a form of a data packet on an IP network. The VoIP may be understood as employed by an Internet phone or an IP phone. The VoIP is widely used because the VoIP can transmit services such as a voice, a fax, a video and data free of charge or at low cost through the Internet.

Figure 1:
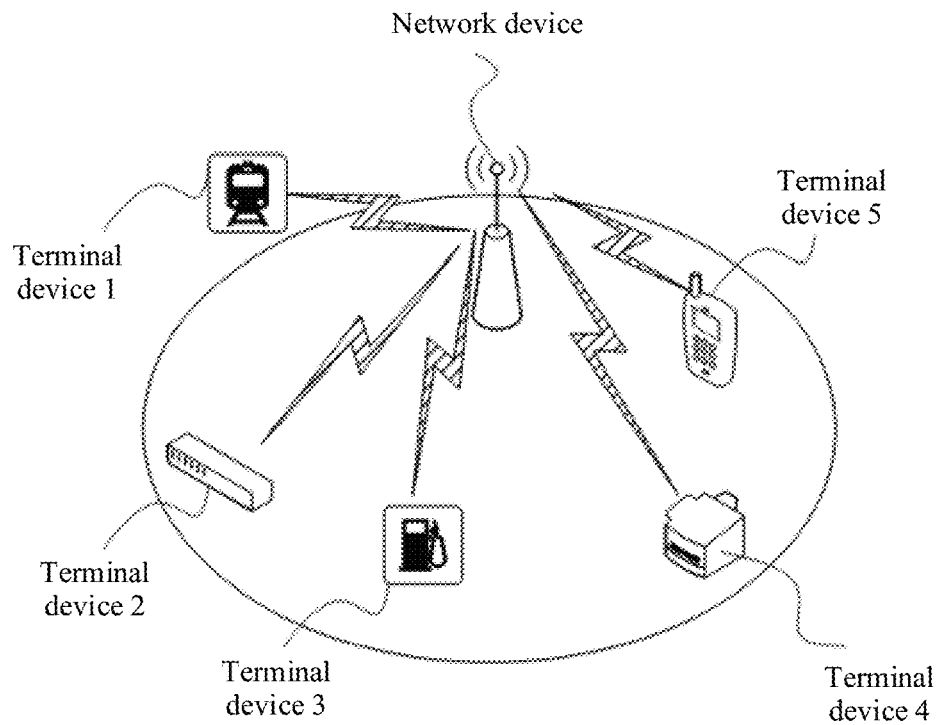
FIG. 1 is a diagram of a structure of a communications system according to an embodiment of this application.

FIG. 1 is a diagram of a structure of a communications system according to an embodiment of this application. As shown in FIG. 1, the communications system includes a network device and a plurality of terminal devices. The network device may communicate with each of the plurality of terminal devices, and at least two of the plurality of terminal devices are managed by a same user account.

The network device in this embodiment of this application is a device on a wireless network, for example, a radio access network (RAN) node that connects a terminal to the wireless network. Currently, some examples of the RAN node are a gNB, a transmission reception point (TRP), an evolved node B (eNB), a radio network controller (RNC), a node B (NB), a base station controller (BSC), a base transceiver station (BTS), a home base station (for example, a home evolved NodeB, or a home Node B, HNB), a base band unit (BBU), a wireless fidelity (Wi-Fi) access point (AP), a communication cloud, and the like. In a network structure, the network device may include a centralized unit (CU) node, a distributed unit (DU) node, or a RAN device including a CU node and a DU node. This is not limited herein.

The terminal device in this embodiment of this application may be a wireless terminal device or a wired terminal device. The wireless terminal device may be a device having a wireless transceiver function, and may be deployed on land, including an indoor or outdoor device, a handheld device, or a vehicle-mounted device; or may be deployed on the water (for example, on a ship); or may be deployed in the air (for example, on an airplane, a balloon, or a satellite). The terminal device may be a mobile phone, a tablet computer (Pad), a computer having a wireless transceiver function, a virtual reality (VR) terminal device, an augmented reality (AR) terminal device, a wireless terminal device in industrial control a wireless terminal device in self driving, a wireless terminal device in remote medical, a wireless terminal device in a smart grid, a wireless terminal device in transportation safety a wireless terminal device in a smart city, a wireless terminal device in a smart home, or the like. This is not limited herein. It may be understood that, in the embodiments of this application, the terminal device may also be referred to as user equipment (UE).

The communications system shown in FIG. 1 may be a 2G, 3G, 4G, or 5G communications system, or a next generation communications system, for example, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency division multiple access (OFDMA) system, a single-carrier FDMA (SC-FDMA) system, a general packet radio service (GPRS) system, a long term evolution (LTE) system, and a new radio (NR) communications system.

In the embodiments of this application, the network device and the terminal device may communicate with each other by using a licensed spectrum, may communicate with each other by using an unlicensed spectrum, or may communicate with each other by using both a licensed spectrum and an unlicensed spectrum. The network device and the terminal device may communicate with each other by using a spectrum below 6 GHZ, may communicate with each other by using a spectrum above 6 GHz, or may communicate with each other by using both a spectrum below 6 GHz and a spectrum above 6 GHz. A spectrum resource used between the network device and the terminal device is not limited in the embodiments of this application.

It should be understood that in the embodiments of the present invention, "B corresponding to A" indicates that B is associated with A. In an implementation, B may be determined based on A. However, it should be further understood that determining B based on A does not mean that B is determined based on only A. B may alternatively be determined based on A and/or other information.

In the descriptions of this application, "a plurality of" means two or more than two unless otherwise specified.

In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference.

The following describes in detail a cross-device communications method provided in this application with reference to specific embodiments.

Figure 2:
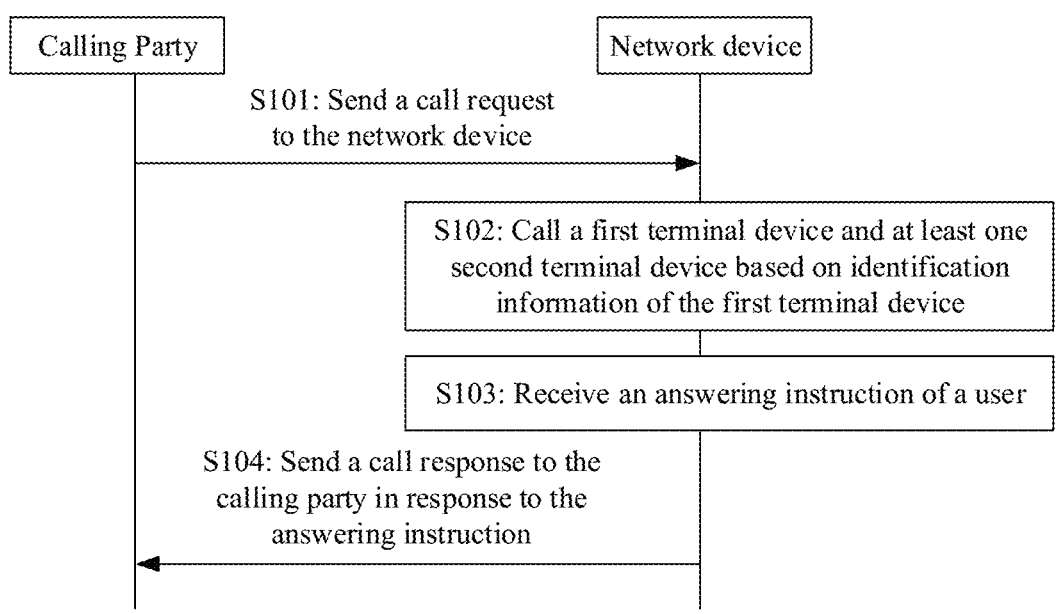
FIG. 2 is a flowchart of a cross-device communications method according to an embodiment of this application.

FIG. 2 is a flowchart of a cross-device communications method according to an embodiment of this application. As shown in FIG. 2, the method in this embodiment of this application includes the following steps.

S101: A calling party sends a call request to a network device.

The call request includes identification information of a called first terminal device.

The identification information of the first terminal device is used to uniquely identify the first terminal device. For example, if the first terminal device is an Internet phone, the identification information of the first terminal is a VoIP number of the first terminal device.

The call request is used to call the first terminal device, so that the calling party establishes a call with the first terminal device.

S102: The network device calls the first terminal device and at least one second terminal device based on the identification information of the first terminal device.

The identification information of the first terminal device and identification information of the at least one second terminal device have a correspondence with a same user account, for example, as shown in Table 1.

TABLE 1

| User account | Identification information of the terminal devices |
| --- | --- |
| A | a1 |
|   | a2 |
|   | a3 |
|   | . . . |
|   | an |

It can be learned from Table 1 that the user account is A, the identification information of the first terminal device is a1, and identification information of n−1 second terminal devices is a2, a3, . . . , and on, where n is a positive integer greater than or equal to 2.

Optionally, the correspondence shown in Table 1 may be sent by the terminal device to the network device when the terminal device registers with the network device, or entered by a user to the network device.

Manners in which the network device may obtain the at least one second terminal device based on the correspondence include but are not limited to the following two manners:

Manner 1: If identification information of a terminal device has a correspondence with a user account, the network device may obtain, based on the identification information of the terminal device, the user account corresponding to the identification information of the terminal device, and further obtain identification information of all other terminal devices under the user account. For example, the network device may obtain, based on the identification information a1 of the first terminal device carried in the call request, that the user account corresponding to the identification information a1 of the first terminal device is A, and further obtain the identification information a2, a3, . . . , and an of the at least one second terminal device under the user account A.

Manner 2: Identification information of a terminal device has a correspondence with two or more user accounts. For example, the identification information a1 of the first terminal device has a correspondence with both the user account A and a user account B. In this case, the call request includes the identification information a1 of the first terminal device and the user account A. In this way, the network device may obtain, based on the identification information a1 of the first terminal device and the user account A, the identification information a2, a3, and an of the at least one second terminal device under the user account A.

After obtaining the identification information of the at least one second terminal device based on the identification information of the first terminal device, the network device starts to call the first terminal device and the at least one second terminal device.

Optionally, the network device simultaneously calls the first terminal device and the at least one second terminal device.

For example, as shown in FIG. 1, it is assumed that the calling party in this embodiment of this application is a terminal device 1, the called first terminal device may be any terminal device of a terminal device 2, a terminal device 3, a terminal device 4, and a terminal device 5. It is assumed that the first terminal device is the terminal device 5.

The terminal device 5, the terminal device 2, the terminal device 3, and the terminal device 4 are managed by a same user account C. In other words, the terminal device 2, the terminal device 3, and the terminal device 4 may be understood as second terminal devices. Identification information of the terminal device 5, the terminal device 2, the terminal device 3, and the terminal device 4 has a correspondence with the same user account C.

Optionally, the terminal device 1, the terminal device 2, the terminal device 3, the terminal device 4, and the terminal device 5 may be managed by a same user account. In other words, identification information of the terminal device 1, the terminal device 2, the terminal device 3, the terminal device 4, and the terminal device 5 has a correspondence with the same user account.

Optionally, the terminal device 1, the terminal device 2, the terminal device 3, the terminal device 4, and the terminal device 5 may belong to different user accounts. The identification information of the terminal device 1 has a correspondence with a user account D. The identification information of the terminal device 2, the terminal device 3, the terminal device 4, and the terminal device 5 has a correspondence with the user account C. The user account C is different from the user account D.

The network device obtains the identification information of the terminal device 5 from the call request, and may obtain, based on the identification information of the terminal device 5, the identification information of the terminal device 2, the terminal device 3, and the terminal device 4 that belongs to the same user account C as the identification information of the terminal device 5. Then, the network device calls the terminal device 5 based on the identification information of the terminal device 5, and separately calls the terminal device 2, the terminal device 3, and the terminal device 4 based on the identification information of the terminal device 2, the terminal device 3, and the terminal device 4.

In an implementation, when calling the first terminal device and the at least one second terminal device, the network device sends a call instruction to the first terminal device and the at least one second terminal device. In this case, S102 may include the following steps.

S1021: The network device obtains, based on the identification information of the first terminal device, the at least one second terminal device under the user account corresponding to the identification information of the first terminal device.

For this step, refer to the specific description of S102. Details are not described herein again.

S1022: The network device sends the call instruction to the first terminal device and the at least one second terminal device.

The call instruction is used to call the first terminal device and the at least one second terminal device.

Optionally, the call instruction sent to the first terminal device includes the identification information of the first terminal device, and the call instruction sent to the second terminal device includes the identification information of the second terminal device. After receiving the call instruction, the first terminal device and the second terminal device enter a pre-call mode.

Optionally, in some examples, when calling the first terminal device and the second terminal device, the network device may further control the first terminal device to ring and the second terminal device not to ring. In this way, the user can learn whether a terminal device directly called by the calling party is the first terminal device or the second terminal device.

In an example, that the network device controls the first terminal device to ring includes: The network device sends a first call instruction to the first terminal device, where the first call instruction includes first ringing indication information, and the first ringing indication information is used to indicate the first terminal device to ring when the first terminal device is called.

In this example, the first call instruction sent by the network device to the first terminal device carries the first ringing indication information, but the call instruction sent to the second terminal device does not carry the first ringing indication information. In this way, when receiving the first call instruction, based on the first ringing indication information carried in the first call instruction, the first terminal device rings when being called. However, the call instruction of the second terminal device does not carry the first ringing indication information. Therefore, the second terminal device does not ring when being called.

In another example, that the network device controls the at least one second terminal device not to ring includes: The network device sends a second call instruction to the at least one second terminal device, where the second call instruction includes second ringing indication information, and the second ringing indication information is used to indicate the at least one second terminal device not to ring when the at least one second terminal device is called.

In this example, the second call instruction sent by the network device to the second terminal device carries the second ringing indication information, but the call instruction sent to the first terminal device does not carry the second ringing indication information. In this way, when receiving the second call instruction, based on the second ringing indication information carried in the second call instruction, the second terminal device does not ring when being called. The call instruction of the first terminal device does not carry the second ringing indication information. Therefore, the first terminal device rings when being called.

Optionally, the first ringing indication information and the second ringing indication information are preset, and the network device and the terminal device know information indicated by the first ringing indication information and the second ringing indication information.

S103: The network device receives an answering instruction of the user.

The answering instruction is used to instruct a third terminal device to answer the call request, and the third terminal device is any one of the first terminal device and the at least one second terminal device.

The user selects, from the first terminal device and the at least one second terminal device, a terminal device configured to answer the call request. For example, the user selects the terminal device 5 to answer the call request.

In this case, the user may send the answering instruction to the network device in different manners, to indicate to the network device that the user selects the third network device to answer the call request.

Manner 1: The user may directly send the answering instruction to the network device. For example, the user sends the answering instruction to the network device through another terminal device. The other terminal device and the network device may communicate with each other.

Optionally, the other terminal device is neither the first terminal device nor the second terminal device.

Optionally, the other terminal device is any terminal device other than the third terminal device and the first terminal device in the first terminal device and the second terminal device.

Manner 2: The user sends the answering instruction to the network device through the third terminal device. For example, the user sends the answering instruction to the third terminal device, and the third terminal device forwards the answering instruction to the network device.

Manner 3: The user sends the answering instruction to the network device through the first terminal device. For example, the user sends the answering instruction to the first terminal device, and the first terminal device forwards the answering instruction to the network device.

Optionally, the answering instruction entered by the user may be voice information. For example, if the user determines that the third terminal used by the user to answer the call request is a speaker, the user enters voice information of "answering the call with the speaker" to the speaker. After receiving the voice information, the speaker converts the voice information into an answering instruction, and sends the answering instruction to the network device.

Optionally, the answering instruction entered by the user is a preset user gesture instruction. For example, the third terminal device determined by the user is an intelligent terminal having a screen, for example, a mobile phone or a watch. In this way, the user may enter a specific gesture instruction on the intelligent terminal having a screen, for example, the mobile phone or the watch. For example, a specific letter or track is entered on the screen. Optionally, if the terminal device has a foldable screen, the answering instruction may be entered by using a gesture of shaking the mobile phone.

In this embodiment of this application, when the calling party calls the first terminal device, the network device not only calls the first terminal device, but also calls the at least one second terminal device under the user account corresponding to the first terminal device. In this way, the user may select, based on a requirement, the first terminal device or the second terminal device to answer the call request of the calling party, to implement cross-device answering between different terminal devices. This improves communication experience of the user.

In addition, the first terminal device and the second terminal device in this embodiment of this application do not need to communicate with each other through Bluetooth. Therefore, no Bluetooth chip need be disposed on the first terminal device and the second terminal device, so that device costs and limitations of the first terminal device and the second terminal device are further reduced.

S104: The network device sends a call response to the calling party in response to the answering instruction.

The call response is used to indicate the third terminal device to establish communication with the calling party.

After receiving the answering instruction entered by the user, the network device sends the call response to the calling party based on the answering instruction, to indicate that a communication channel is established between the calling party and the third terminal device, and the calling party may communicate with the third terminal device.

Optionally, the call response may further include identification information of the third terminal device, so that the calling party knows the terminal device communicating with the calling party.

According to the cross-device communications method provided in this embodiment of this application, the network device receives the call request of the calling party, where the call request includes the identification information of the called first terminal device; calls the first terminal device and the at least one second terminal device based on the identification information of the first terminal device, where the identification information of the second terminal device and the first terminal device has a correspondence with the same user account; then receives the answering instruction of the user, where the answering instruction is used to instruct the third terminal device to answer the call request, and the third terminal device is any one of the first terminal device and the at least one second terminal device; and sends the call response to the calling party in response to the answering instruction, where the call response is used to indicate the third terminal device to establish communication with the calling party. In other words, the network device in this embodiment of this application may simultaneously call the first terminal device and the second terminal device that are under the same user account, and the user may select, based on an actual requirement, the first terminal device or the second terminal device to answer the call request of the calling party. This helps the user quickly transfer and answer the call, thereby improving user experience. In addition, Bluetooth chips do not need to be disposed on the first terminal device and the second terminal device, so that device costs are further reduced.

Figure 3:
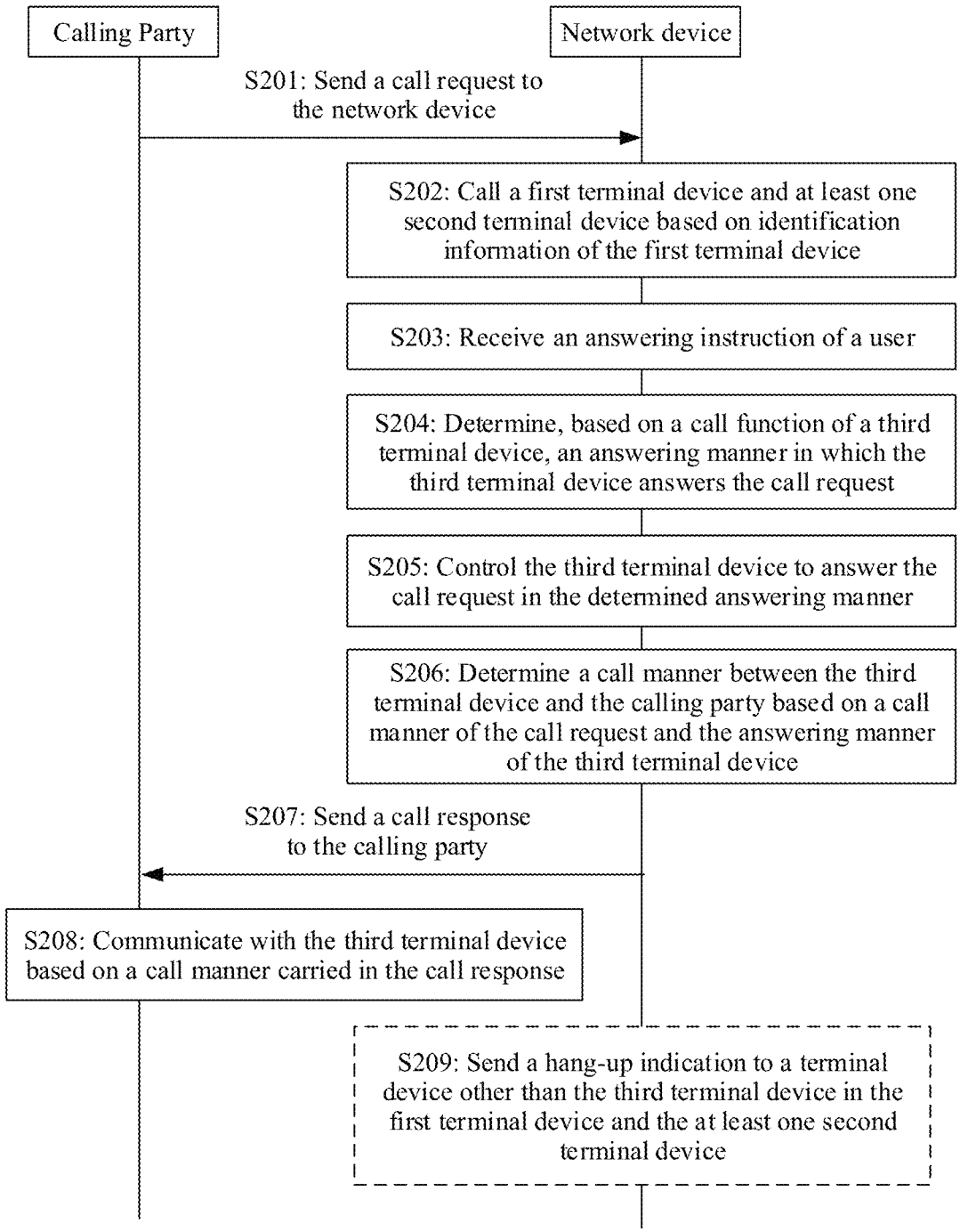
FIG. 3 is a flowchart of a cross-device communications method according to an embodiment of this application.

FIG. 3 is a flowchart of a cross-device communications method according to an embodiment of this application. Based on the foregoing embodiments, as shown in FIG. 3, the method in this embodiment of this application includes the following steps.

S201: A calling party sends a call request to a network device.

The call request includes identification information of a called first terminal device.

S202: The network device calls the first terminal device and at least one second terminal device based on the identification information of the first terminal device.

Identification information of the second terminal device and the first terminal device has a correspondence with a same user account.

Figure 4:
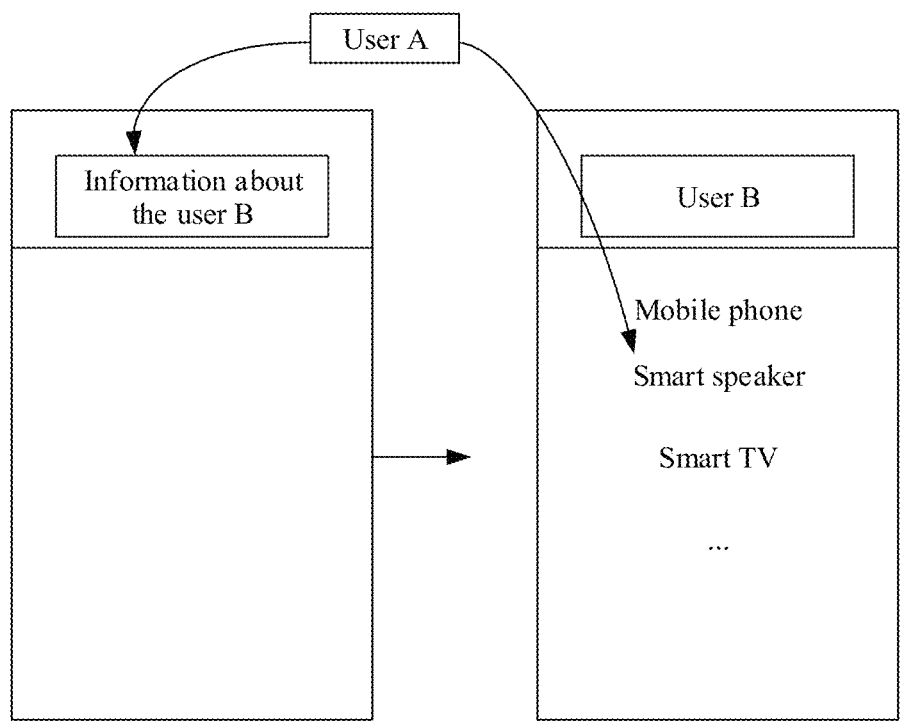
FIG. 4 is a schematic diagram of a user interface according to an embodiment of this application.

In an example, FIG. 4 is a schematic diagram of a user interface according to an embodiment of this application. As shown in FIG. 4, a user A calls a user B, and the user A enters information about the user B in a search bar on a user interface of a terminal device of the user A shown on the left, for example, an account of the user B, a mobile phone number of the user B, or identification information of another terminal device of the user B. A search result interface shown on the right may be obtained. The search result interface displays all terminal devices under a same account of the user B, for example, a mobile phone, a smart speaker, and a smart TV. The user A may select a terminal device on the search result interface as the first terminal device to communicate with the user B. For example, the user A selects the smart speaker of the user B as the first terminal device to implement communication with the user B.

S203: The network device receives an answering instruction of a user.

The answering instruction is used to instruct a third terminal device to answer the call request, and the third terminal device is any one of the first terminal device and the at least one second terminal device.

For a specific implementation process of S201 to S203, refer to the specific descriptions of S101 to S103. Details are not described herein again.

S204: The network device determines, based on a call function of the third terminal device, an answering manner in which the third terminal device answers the call request.

The call function of the third terminal device includes: supporting a voice call but not supporting a video call, or supporting both a voice call and a video call.

Specifically, when registering with the network device, the third terminal device sends device information of the third terminal device to the network device. The network device may determine the call function of the third terminal device based on the device information of the third terminal device. For example, the device information of the third terminal device includes a camera, a screen, an earpiece, a microphone, and the like. In this case, the network device may determine that the third terminal device supports both a voice call and a video call. For another example, the device information of the third terminal device includes a screen, an earpiece, a microphone, and the like, but does not include a camera. In this case, the network device may determine that the third terminal device supports a voice call but does not support a video call.

The answering manner in which the third terminal device answers the call request of the calling party is a voice call or a video call.

The answering manner determined by the network device based on the call function of the third terminal device in S204 and in which the third terminal device answers the call request includes but is not limited to the following manners:

Manner 1: The answering manner of the third terminal device is determined based on the call function of the third terminal device.

For example, if the call function of the third terminal device is supporting a voice call but not supporting a video call, it is determined that the answering manner in which the third terminal device answers the call request is a voice call. If the call function of the third terminal device is supporting both a voice call and a video call, it is determined that the answering manner in which the third terminal device answers the call request is a video call.

Manner 2: The answering manner of the third terminal device is determined based on the call function of the third terminal device and a call manner of the call request of the calling party.

For example, a call function of the calling party is supporting a voice call and a video call, and the call function of the third terminal device is supporting a voice call but not supporting a video call. In this case, regardless of whether the call manner of the call request is a voice call or a video call, it is determined that the answering manner of the third terminal device is a voice call.

For example, if a call function of the calling party is supporting a voice call and a video call, the call function of the third terminal device is supporting both a voice call and a video call, and the call manner of the call request is a voice call, it is determined that the answering manner of the third terminal device is a voice call or a video call.

For example, if a call function of the calling party is supporting a voice call and a video call, the call function of the third terminal device is supporting both a voice call and a video call, and the call manner of the call request is a video call, it is determined that the answering manner of the third terminal device is a video call or a voice call.

For example, if a call function of the calling party is supporting a voice call and a video call, the call function of the third terminal device is supporting a voice call but not supporting a video call, and the call manner of the call request is a voice call, it is determined that the answering manner of the third terminal device is a voice call.

For example, a call function of the calling party is supporting a voice call but not supporting a video call, and the call manner of the call request is a voice call. In this case, regardless of whether the call function of the third terminal device is supporting a voice call and a video call or supporting a voice call but not supporting a video call, it is determined that the answering manner of the third terminal device is a voice call.

It should be noted that a device that supports a video call also supports a voice call in this embodiment of this application.

S205: The network device controls the third terminal device to answer the call request in the determined answering manner.

S206: The network device determines a call manner between the third terminal device and the calling party based on the call manner of the call request and the answering manner of the third terminal device.

The call response includes the call manner between the third terminal device and the calling party.

Based on Manner 2 in S204, S206 may include the following cases:

Case 1: If the call manner of the call request is a video call, and the answering manner of the third terminal device is a voice call, it is determined that the third terminal device communicates with the calling party in a voice call manner.

Case 2: If the call manner of the call request is a video call, and the answering manner of the third terminal device is a video call, it is determined that the third terminal device communicates with the calling party in a video call manner.

Case 3: If the call manner of the call request is a video call, and the answering manner of the third terminal device is a voice call, it is determined that the third terminal device communicates with the calling party in a voice call manner, and the calling party communicates with the third terminal device in a video call manner.

Case 4: If the call manner of the call request is a voice call, and the answering manner of the third terminal device is a voice call, it is determined that the third terminal device communicates with the calling party in a voice call manner.

Case 5: If the call manner of the call request is a voice call, and the answering manner of the third terminal device is a video call, it is determined that the third terminal device communicates with the calling party in a video call manner.

Case 6: If the call manner of the call request is a voice call, and the answering manner of the third terminal device is a video call, it is determined that the third terminal device communicates with the calling party in a video call manner, and the calling party communicates with the third terminal device in a voice call manner.

S207: The network device sends a call response to the calling party.

The call response includes the call manner between the third terminal device and the calling party.

S208: The calling party communicates with the third terminal device based on the call manner carried in the call response.

The call manner between the calling party and the third terminal device may include the six cases in S206.

In some embodiments, S206 to S208 may be replaced with the following step A1 and step A2.

Step A1: The network device sends the call response to the calling party.

The call response is used to indicate the third terminal device to establish communication with the calling party.

Step A2: The calling party selects, based on the call manner of the call request, a call manner consistent with the call manner to communicate with the third terminal device.

For example, if the call manner of the calling party is a voice call, the calling party selects to communicate with the third terminal device in the voice call manner; or if the call manner of the calling party is a video call, the calling party selects to communicate with the third terminal device in the video call manner.

Optionally, if the call manner of the calling party is inconsistent with the answering manner of the third terminal device, the call manner between the calling party and the third terminal device has the following several cases:

Case 1: The call manner of the calling party is a video call, and the answering manner of the third terminal device is a voice call. In this case, when the calling party communicates with the third terminal device, the calling party answers a call of the third terminal device in the video call manner, and the third terminal device answers a call of the calling party in the voice call manner.

Case 2: The call manner of the calling party is a voice call, and the answering manner of the third terminal device is a video call. In this case, when the calling party communicates with the third terminal device, the calling party answers a call of the third terminal device in the voice call manner, and the third terminal device answers a call of the calling party in the video call manner.

In some embodiments, S206 to S208 may be replaced with the following step B1 and step B2.

Step B1: The network device sends the call response to the calling party.

The call response includes the answering manner in which the third terminal device answers the call request.

Step B2: The calling party selects, based on the answering manner of the third terminal device, a call manner consistent with the answering manner to communicate with the third terminal device.

Specifically, after determining, based on the foregoing steps, the answering manner in which the third terminal device answers the call request, the network device controls the third terminal device to answer the call request in the answering manner. At the same time, the network device adds the answering manner of the third terminal device to the call response and sends the call response to the calling party, so that the calling party determines the call manner of the calling party based on the answering manner of the third terminal device. For example, if the answering manner of the third terminal device is a voice call, and the call manner of the calling party is a video call, the calling party downgrades a current call manner from the video call to the voice call, to implement communication with the third terminal device. For another example, if the answering manner of the third terminal device is a video call, and the call manner of the calling party is a voice call, the calling party upgrades a current call manner from the voice call to the video call, to implement communication with the third terminal device.

In some embodiments, the method in this embodiment of this application further includes:

S209: The network device sends a hang-up indication to a terminal device other than the third terminal device in the first terminal device and the at least one second terminal device.

The hang-up indication indicates the terminal device to hang up the call of the network device.

S209 may be performed before S204, or may be performed before S205, or may be performed simultaneously with S205, or may be performed before S206, or may be performed simultaneously with S206, or may be performed after S206. This is not limited in this embodiment of this application. A specific sequence is determined based on an actual requirement.

The following further describes the foregoing communication manners in this application with reference to specific examples. It should be noted that in the following examples, a terminal device used by the user A to call the user B supports a voice call and a video call.

Figure 5:
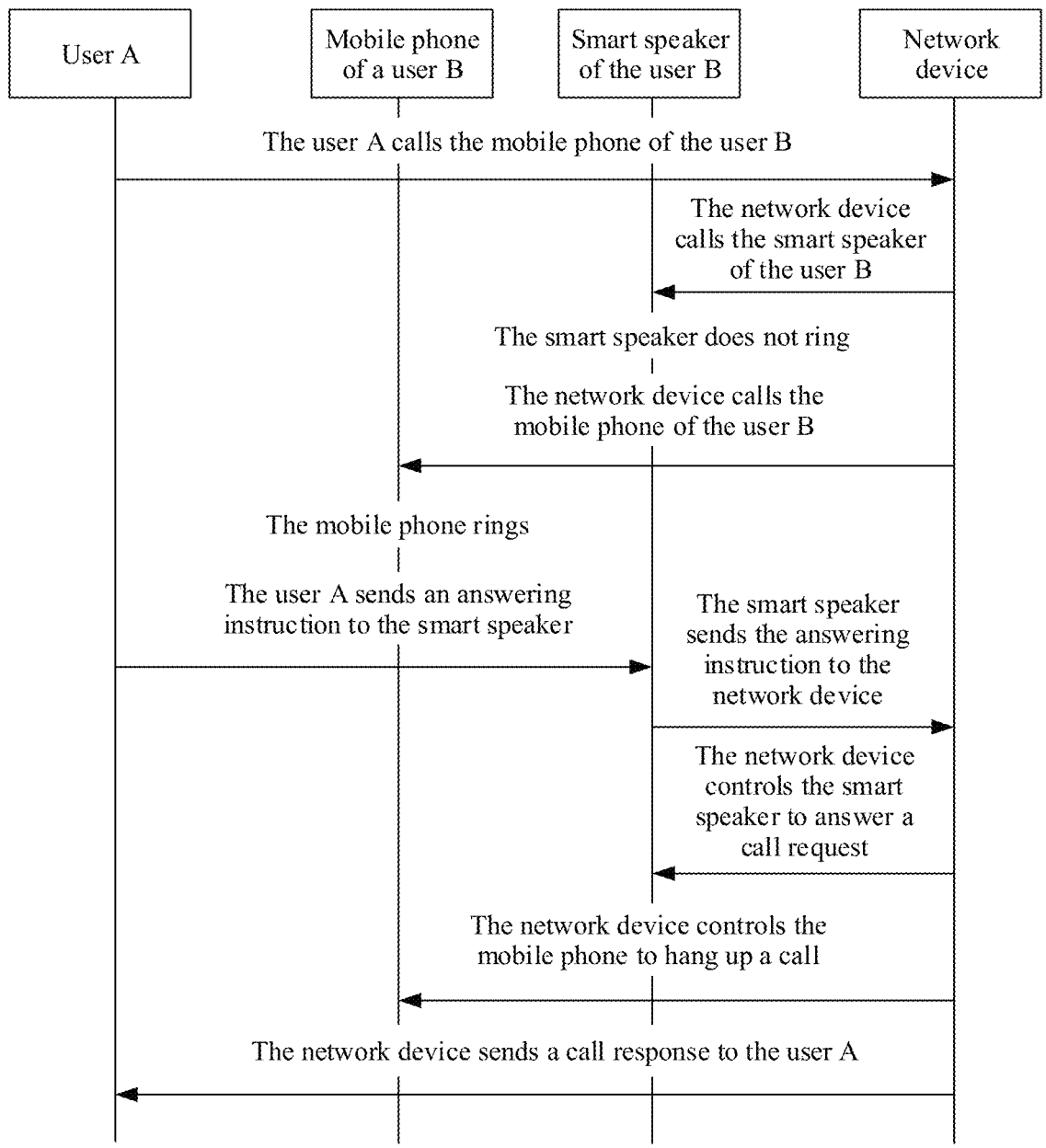
FIG. 5 is a flowchart of an example of a cross-device communications method according to an embodiment of this application.

Example 1: As shown in FIG. 5, the user A is the calling party, and the user A calls the mobile phone of the user B. The mobile phone and the smart speaker are included under the same user account of the user B. The mobile phone may be understood as the first terminal device, and the smart speaker may be understood as the second terminal device.

Specifically, the user A calling the mobile phone of the user B is that the user A sends a call request, where the call request carries identification information of the mobile phone of the user B. After receiving the call request, the network device obtains, based on the identification information of the mobile phone carried in the call request, identification information of the smart speaker under the account, of the user B, that corresponds to the identification information of the mobile phone. The network device calls the mobile phone based on the identification information of the mobile phone, and calls the smart speaker based on the identification information of the smart speaker. Optionally, when being called, the mobile phone rings but the smart speaker does not ring. When hearing that the mobile phone rings, the user controls, by using their voice or a gesture, the speaker to answer the call request. Specifically, the user enters, by using their voice or the gesture, an answering instruction to the smart speaker, where the answering instruction instructs the smart speaker to answer the call request. The smart speaker sends the received answering instruction to the network device. In this case, if a manner in which the user A calls the mobile phone of the user B is a video call, but the smart speaker supports a voice call and does not support a video call, the network device determines that an answering manner of the smart speaker is a voice call. The network device controls the smart speaker to answer the call request in a voice call manner, and sends a hang-up indication to the mobile phone, so that the mobile phone hangs up the call of the network device. In addition, the network device adds the answering manner of the smart speaker to a call response and sends the call response to the user A. The user A may downgrade a current call manner from the video call to the voice call, to implement communication with the smart speaker.

In this example, when there is a call on the mobile phone, the user may be notified to control the smart speaker to answer the call, and downgrade the video call to the voice call.

Figure 6:
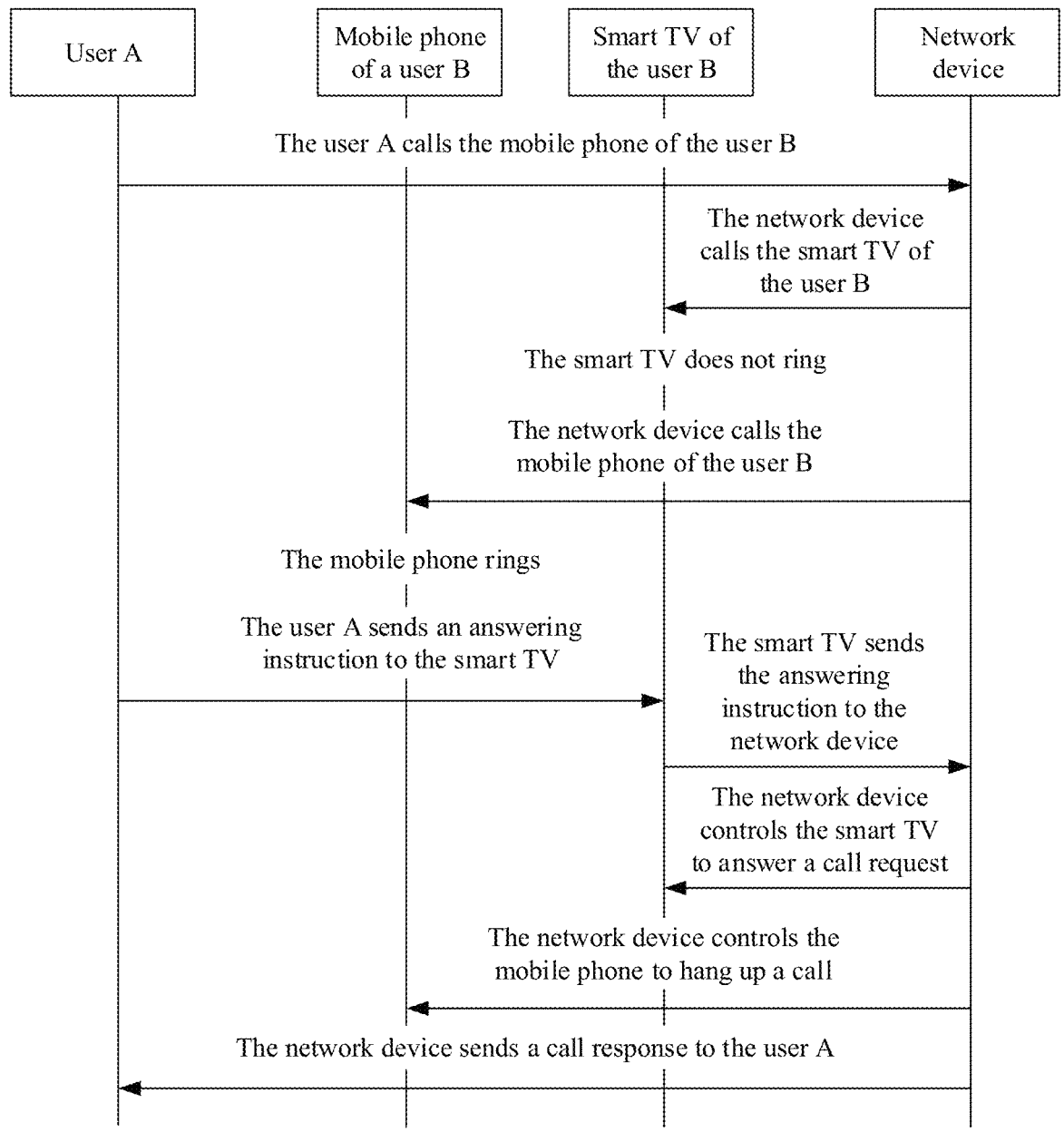
FIG. 6 is a flowchart of another example of a cross-device communications method according to an embodiment of this application.

Example 2: As shown in FIG. 6, the user A is the calling party, and the user A calls the mobile phone of the user B. The mobile phone and the smart TV are included under the same user account of the user B. The mobile phone may be understood as the first terminal device, and the smart TV may be understood as the second terminal device.

Specifically, the user A calling the mobile phone of the user B is that the user A sends a call request, where the call request carries identification information of the mobile phone of the user B. After receiving the call request, the network device obtains, based on the identification information of the mobile phone carried in the call request, identification information of the smart TV under the account, of the user B, that corresponds to the identification information of the mobile phone. The network device calls the mobile phone based on the identification information of the mobile phone, and calls the smart TV based on the identification information of the smart TV. Optionally, when being called, the mobile phone rings but the smart TV does not ring. When hearing that the mobile phone rings, the user controls, by using their voice or a gesture, the smart TV to answer the call request. Specifically, the user enters, by using the their voice or the gesture, an answering instruction to the smart TV, where the answering instruction instructs the smart TV to answer the call request. The smart TV sends the received answering instruction to the network device. In this case, if a manner in which the user A calls the mobile phone of the user B is a voice call, but the smart TV supports a video call, the network device determines that an answering manner of the smart TV is a video call. The network device controls the smart TV to answer the call request in a video call manner, and sends a hang-up indication to the mobile phone, so that the mobile phone hangs up the call of the network device. In addition, the network device adds the answering manner of the smart TV to a call response and sends the call response to the user A. The user A may upgrade a current call manner from the voice call to the video call, to implement communication with the user B.

In this example, when there is a call on the mobile phone, the user may control the smart TV to answer the call, and upgrade the voice call to the video call.

Figure 7:
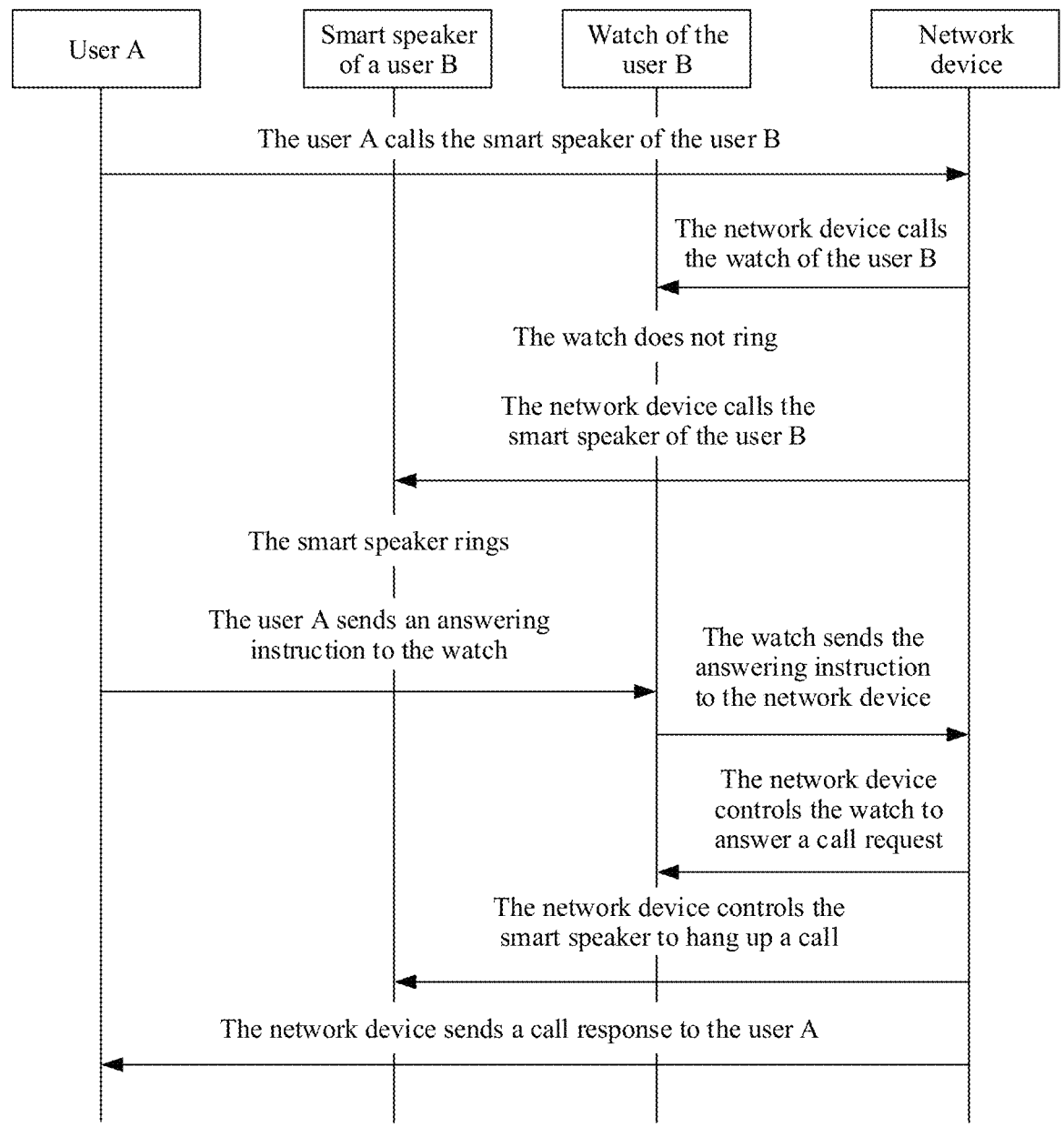
FIG. 7 is a flowchart of another example of a cross-device communications method according to an embodiment of this application.

Example 3: As shown in FIG. 7, the user A is the calling party, and the user A calls the smart speaker of the user B. The watch and the smart speaker are included under the same user account of the user B. The watch has a touchscreen. The smart speaker may be understood as the first terminal device, and the watch may be understood as the second terminal device.

Specifically, the user A calling the smart speaker of the user B is that the user A sends a call request, where the call request carries identification information of the smart speaker of the user B. After receiving the call request, the network device obtains, based on the identification information of the smart speaker carried in the call request, identification information of the watch under the account, of the user B, that corresponds to the identification information of the smart speaker. The network device calls the smart speaker based on the identification information of the smart speaker, and calls the watch based on the identification information of the watch. Optionally, when being called, the smart speaker rings but the watch does not ring. When hearing that the smart speaker rings, the user controls, by using their voice or a gesture, the watch to answer the call request. Specifically, the user enters, by using their voice or the gesture, an answering instruction to the smart speaker, where the answering instruction instructs the watch to answer the call request. The smart speaker sends the received answering instruction to the network device. In this case, if a manner in which the user A calls the smart speaker of the user B is a voice call, but the watch supports a video call, the network device determines that an answering manner of the watch is a video call. The network device controls the watch to answer the call request in a video call manner, and sends a hang-up indication to the smart speaker, so that the smart speaker hangs up the call of the network device. In addition, the network device adds the answering manner of the watch to a call response and sends the call response to the user A. The user A may upgrade a current call manner from the voice call to the video call, to implement communication with the user B.

In this example, the user may directly call another terminal device other than the mobile phone. For example, when there is a call on the speaker, the user may control the intelligent terminal having a screen, for example, the mobile phone or the watch to answer the call.

Figure 8:
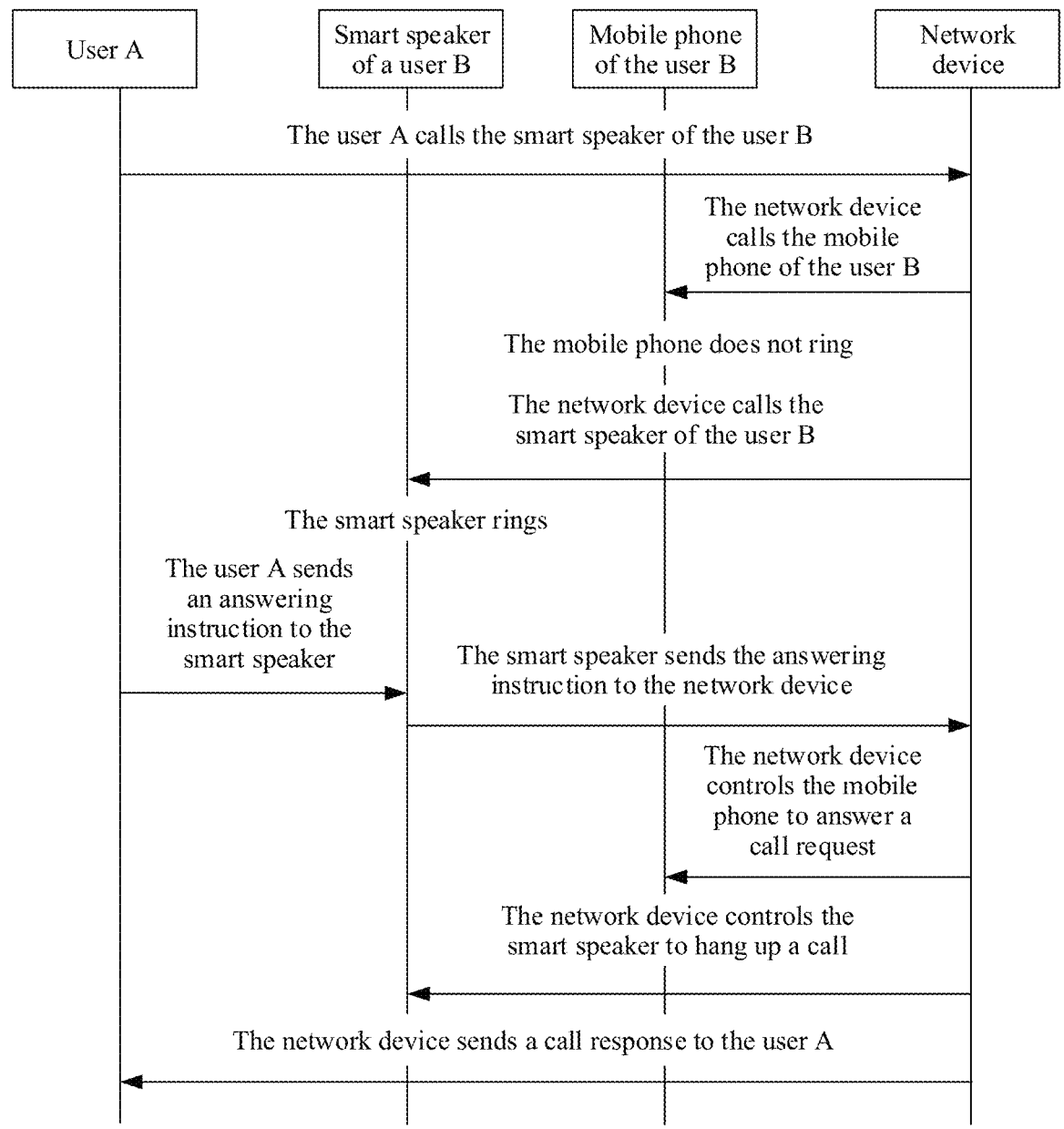
FIG. 8 is a flowchart of another example of a cross-device communications method according to an embodiment of this application.

Example 4: As shown in FIG. 8, the user A is the calling party, and the user A calls the smart speaker of the user B. The mobile phone and the smart speaker are included under the same user account of the user B. The smart speaker may be understood as the first terminal device, and the mobile phone may be understood as the second terminal device.

Specifically, the user A calling the smart speaker of the user B is that the user A sends a call request, where the call request carries identification information of the smart speaker of the user B. After receiving the call request, the network device obtains, based on the identification information of the smart speaker carried in the call request, identification information of the mobile phone under the account, of the user B, that corresponds to the identification information of the smart speaker. The network device calls the mobile phone based on the identification information of the mobile phone, and calls the smart speaker based on the identification information of the smart speaker. Optionally, when being called, the smart speaker rings but the mobile phone does not ring. When hearing that the smart speaker rings, the user enters, by using a voice, an answering instruction to the smart speaker, where the answering instruction instructs the mobile phone to answer the call request. The smart speaker sends the received answering instruction to the network device. In this case, if a manner in which the user A calls the smart speaker of the user B is a voice call, but the mobile phone supports a video call, the network device determines that an answering manner of the mobile phone is a video call. The network device controls the mobile phone to answer the call request in a video call manner, and sends a hang-up indication to the smart speaker, so that the smart speaker hangs up the call of the network device. In addition, the network device adds the answering manner of the mobile phone to a call response and sends the call response to the user A. The user A may upgrade a current call manner from the voice call to the video call, to implement communication with the user B.

In this example, when there is a call on the smart speaker, the user controls, on the smart speaker, another terminal device such as the mobile phone or the watch under the user account to answer the call.

According to the cross-device communications method provided in this embodiment of this application, the network device receives the call request of the calling party, where the call request includes the identification information of the called first terminal device; calls the first terminal device and the at least one second terminal device based on the identification information of the first terminal device, where the identification information of the second terminal device and the first terminal device has the correspondence with the same user account; and then receives the answering instruction of the user, where the answering instruction is used to instruct the third terminal device to answer the call request, and the third terminal device is any one of the first terminal device and the at least one second terminal device. Then, the network device determines, based on the call function of the third terminal device, the answering manner in which the third terminal device answers the call request; adds the answering manner to the call response; and sends the call response to the calling party. In this way, the calling party determines the current call manner based on the answering manner of the third terminal device, to implement reliable communication with the third terminal device. In other words, the network device in this embodiment of this application may simultaneously call the first terminal device and the second terminal device that are under the same user account, and the user may select, based on an actual requirement, the first terminal device or the second terminal device to answer the call request of the calling party. This helps the user quickly transfer and answer the call, thereby improving user experience. In addition, the answering manner of the third terminal device is sent to the calling party, so that the call manner of the calling party matches the answering manner of the third terminal device. This further ensures that the calling party can communicate with the third terminal device, and improves reliability of cross-device communication.

Figure 9:
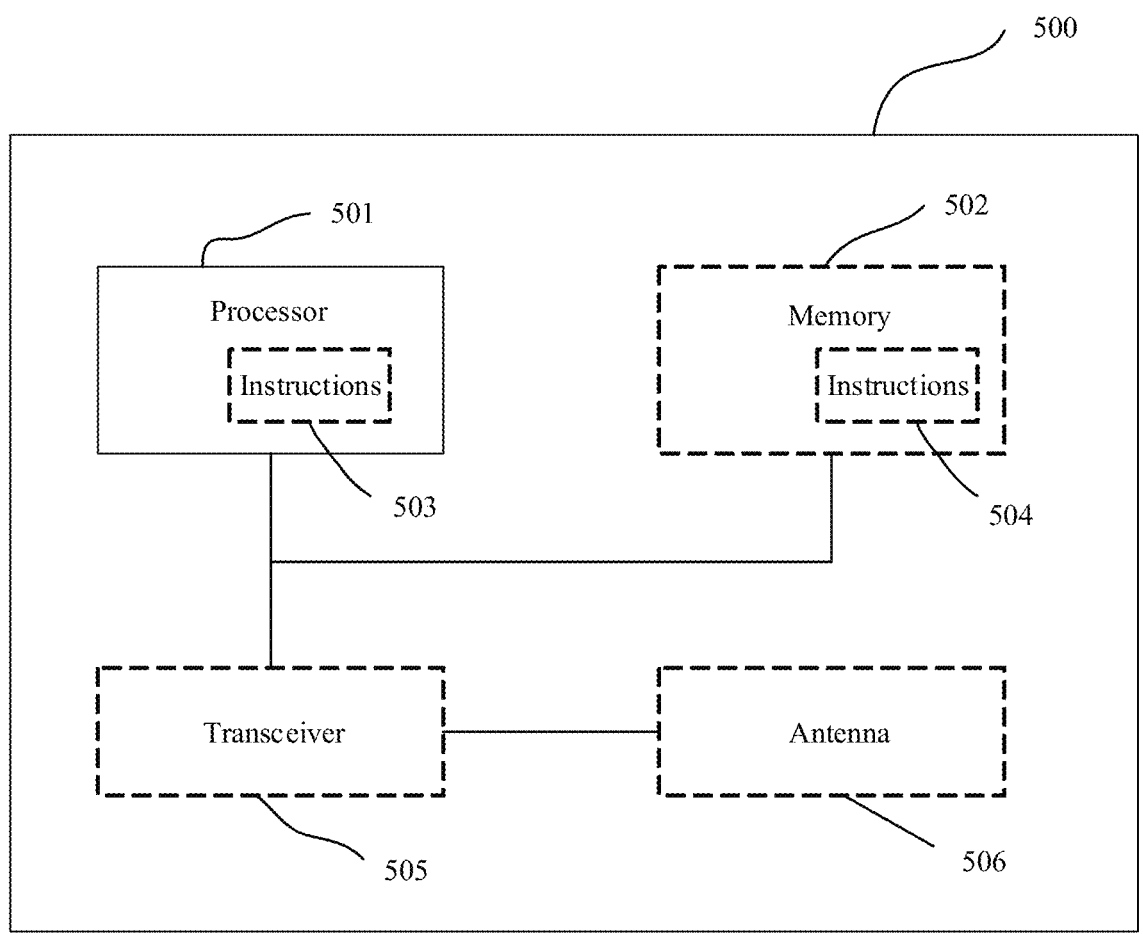
FIG. 9 is a schematic diagram of a structure of a communications device according to an embodiment of this application.

FIG. 9 is a schematic diagram of a structure of a communications device according to an embodiment of this application. As shown in FIG. 9, a communications device 500 in this embodiment may be the terminal device (or a component that can be used in the terminal device) or the network device (or a component that can be used in the network device) mentioned in the foregoing method embodiments. The communications device may be configured to implement the method that corresponds to the terminal device or the network device and that is described in the foregoing method embodiments. For details, refer to descriptions in the foregoing method embodiments.

The communications device 500 may include one or more processors 501. The processor 501 may also be referred to as a processing unit, and can implement a specific control or processing function. The processor 501 may be a general-purpose processor, a dedicated processor, or the like. For example, the processor may be a baseband processor or a central processing unit. The baseband processor may be configured to process a communication protocol and communication data. The central processing unit may be configured to: control the communications device, execute a software program, and process data of the software program.

In a possible design, the processor 501 may also store instructions 503 or data (for example, intermediate data). The instructions 503 may be run by the processor, so that the communications device 500 performs the method that corresponds to the terminal device or the network device and that is described in the foregoing method embodiments.

In another possible design, the communications device 500 may include a circuit, and the circuit can implement a sending, receiving, or communication function in the foregoing method embodiments.

Optionally, the communications device 500 may include one or more memories 502, and the memory 502 may store instructions 504. The instructions may be run on the processor, so that the communications device 500 performs the method described in the foregoing method embodiments.

Optionally, the processor 501 and the memory 502 may be separately disposed, or may be integrated together.

Optionally, the communications device 500 may further include a transceiver 505 and/or an antenna 506. The processor 501 may be referred to as a processing unit, and controls the communications device (for example, a terminal device or a network device). The transceiver 505 may be referred to as a transceiver unit, a transceiver machine, a transceiver circuit, a transceiver, or the like, and is configured to implement a transceiver function of the communications device.

In a design, the communications device 500 is configured to implement operations corresponding to the network device in the foregoing embodiments. For example, the transceiver 505 may receive a call request of a calling party, where the call request includes identification information of a called first terminal device. The processor 501 may call the first terminal device and at least one second terminal device based on the identification information of the first terminal device, where identification information of the first terminal device and the second terminal device has a correspondence with a same user account. The transceiver 505 may receive an answering instruction of a user, where the answering instruction is used to instruct a third terminal device to answer the call request, and the third terminal device is any one of the first terminal device and the at least one second terminal device; and send a call response to the calling party in response to the answering instruction, where the call response is used to indicate the third terminal device to establish communication with the calling party.

For specific implementation processes of the transceiver 505 and the processor 501, refer to related descriptions in the foregoing embodiments. Details are not described herein again.

In another design, the communications device is configured to implement operations corresponding to the calling party in the foregoing embodiments. For example, the transceiver 505 may send a call request, where the call request includes identification information of a called first terminal device; and receive a call response, where the call response is used to indicate the calling party to establish communication with a third terminal device, the third terminal device is any one of the first terminal device and at least one second terminal device, and identification information of the first terminal device and the second terminal device has a correspondence with a same user account.

For specific implementation processes of the transceiver 505 and the processor 501, refer to related descriptions in the foregoing embodiments. Details are not described herein again.

The processor 501 and the transceiver 505 that are described in this application may be implemented on an integrated circuit (IC), an analog IC, a radio frequency integrated circuit (RFIC), a hybrid signal IC, an application-specific integrated circuit (ASIC), a printed circuit board (PCB), an electronic device, or the like. The processor 501 and the transceiver 505 may alternatively be manufactured by using various 1C process technologies, for example, a complementary metal oxide semiconductor (CMOS), an n-type metal oxide semiconductor (NMOS), a p-channel metal oxide semiconductor (PMOS), a bipolar junction transistor (BJT), a bipolar CMOS (BiCMOS), silicon germanium (SiGe), and gallium arsenide (GaAs).

Although in the descriptions of the foregoing embodiment, the communications device 500 is described by using the terminal device or the network device as an example, the communications device described in this application is not limited to the terminal device or the network device, and a structure of the communications device may not be limited to that shown in FIG. 9.

The communications device in this embodiment of this application may be configured to execute the technical solutions performed by the terminal device (or the network device) in the foregoing method embodiments. An implementation principle and technical effects thereof are similar, and details are not described herein again.

Figure 10:
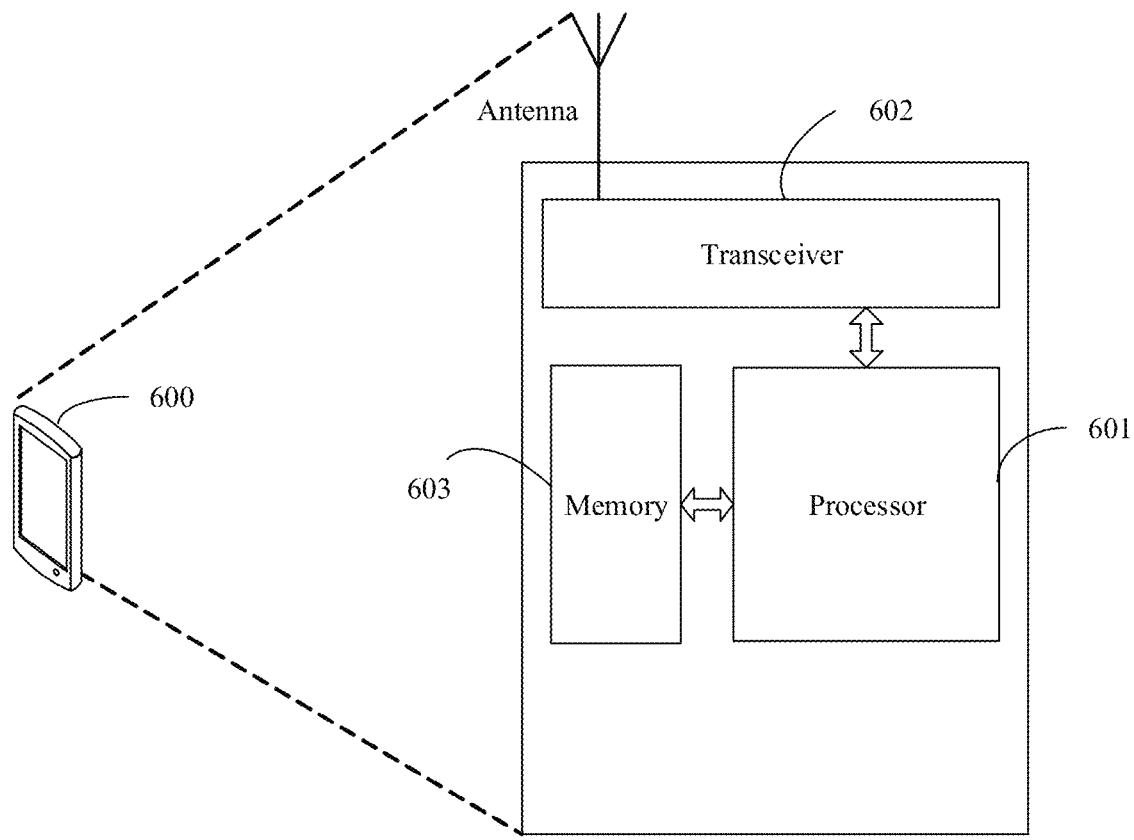
FIG. 10 is a schematic diagram of a structure of a terminal device according to an embodiment of this application.

FIG. 10 is a schematic diagram of a structure of a terminal device according to an embodiment of this application. A terminal device 600 may implement functions performed by the calling party in the foregoing method embodiments. The functions may be implemented by hardware, or may be implemented by hardware by executing corresponding software. The hardware or software includes one or more modules or units corresponding to the functions.

In a possible design, a structure of the terminal device 600 includes a processor 601, a transceiver 602, and a memory 603. The processor 601 is configured to support the terminal device 600 in performing a corresponding function in the foregoing methods. The transceiver 602 is configured to support communication between the terminal device 600 and another terminal device or a network device. The terminal device 600 may further include the memory 603. The memory 603 is configured to be coupled to the processor 601, and stores program instructions and data that are necessary for the terminal device 600.

After the terminal device 600 is powered on, the processor 601 may read the program instructions and the data in the memory 603, interpret and execute the program instructions, and process data of the program instructions. When data is to be sent, after performing baseband processing on the to-be-sent data, the processor 601 outputs a baseband signal to the transceiver 602. After performing radio frequency processing on the baseband signal, the transceiver 602 sends a radio frequency signal in a form of an electromagnetic wave through an antenna. When data is sent to the terminal device, the transceiver 602 receives a radio frequency signal through the antenna, converts the radio frequency signal into a baseband signal, and outputs the baseband signal to the processor 601. The processor 601 converts the baseband signal into data and processes the data.

A person skilled in the art may understand that for ease of description, FIG. 10 shows only one memory 603 and one processor 601. An actual terminal device 600 may have a plurality of processors 601 and a plurality of memories 603. The memory 603 may also be referred to as a storage medium, a storage device, or the like. This is not limited in this embodiment of this application.

The terminal device in this embodiment of this application may be configured to execute the technical solutions of the calling party in the foregoing method embodiments. An implementation principle and technical effects thereof are similar to those in the method embodiments, and details are not described herein again.

Figure 11:
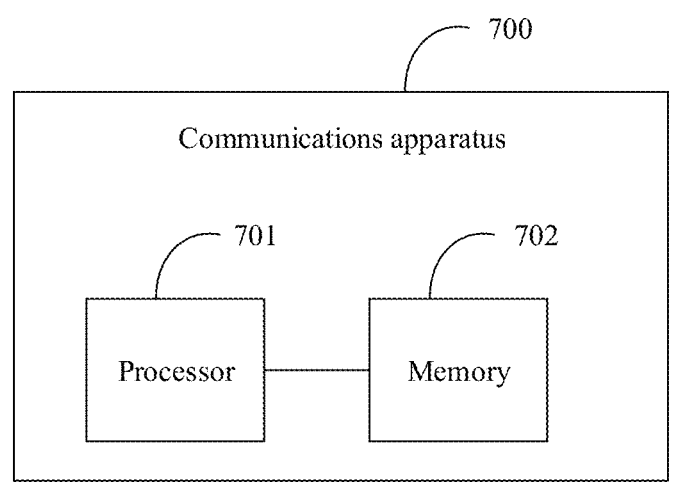
FIG. 11 is a schematic diagram of a structure of a communications apparatus according to an embodiment of this application.

FIG. 11 is a schematic diagram of a structure of a communications apparatus according to an embodiment of this application. A communications apparatus 700 exists in a product form of a chip. A structure of the communications apparatus includes a processor 701 and a memory 702. The memory 702 is configured to be coupled to the processor 701. The memory 702 stores program instructions and data that are necessary for the communications apparatus. The processor 701 is configured to execute the program instructions stored in the memory 702, so that the communications apparatus performs functions of the calling party in the foregoing method embodiments.

The apparatus in this embodiment of this application may be configured to execute the technical solutions of the calling party in the foregoing method embodiments. An implementation principle and technical effects thereof are similar to those in the method embodiments, and details are not described herein again.

Figure 12:
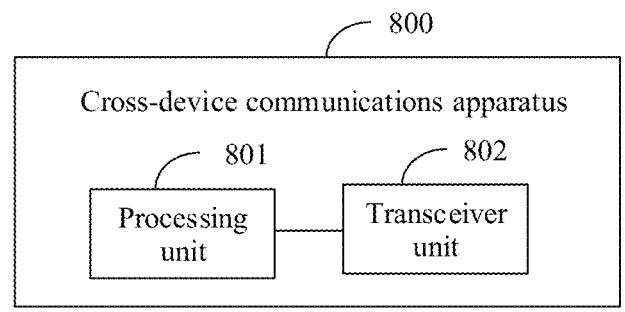
FIG. 12 is a schematic diagram of a structure of a cross-device communications apparatus according to an embodiment of this application.

FIG. 12 is a schematic diagram of a structure of a cross-device communications apparatus according to an embodiment of this application. The communications apparatus may be a terminal device of a calling party, or may be a component (for example, an integrated circuit or a chip) of a terminal device. As shown in FIG. 12, a communications apparatus 800 may include a processing unit 801 and a transceiver unit 802.

The transceiver unit 802 is configured to send a call request, where the call request includes identification information of a called first terminal device.

The transceiver unit 802 is further configured to receive a call response, where the call response is used to indicate the calling party to establish communication with a third terminal device, the third terminal device is any one of the first terminal device and at least one second terminal device, and identification information of the first terminal device and the second terminal device has a correspondence with a same user account.

In an implementation, the processing unit 802 is configured to select, based on an answering manner of the third terminal device, a call manner consistent with the answering manner to communicate with the third terminal device.

Optionally, the answering manner is a voice call or a video call.

In an implementation, the call request includes a call manner in which the calling party calls the first terminal device, and the processing unit 802 is configured to select, based on the call manner, a call manner consistent with the call manner to communicate with the third terminal device.

In an example manner, the call response includes a call manner between the third terminal device and the calling party, and the processing unit 802 is configured to communicate with the third terminal device based on the call manner carried in the call response.

In some specific examples, if the call manner of the call request is a video call, and the answering manner of the third terminal device is a voice call, the third terminal device communicates with the calling party in a voice call manner; if the call manner of the call request is a video call, and the answering manner of the third terminal device is a video call, the third terminal device communicates with the calling party in a video call manner; if the call manner of the call request is a video call, and the answering manner of the third terminal device is a voice call, the third terminal device communicates with the calling party in a voice call manner, and the calling party communicates with the third terminal device in a video call manner; if the call manner of the call request is a voice call, and the answering manner of the third terminal device is a voice call, the third terminal device communicates with the calling party in a voice call manner; if the call manner of the call request is a voice call, and the answering manner of the third terminal device is a video call, the third terminal device communicates with the calling party in a video call manner; or if the call manner of the call request is a voice call, and the answering manner of the third terminal device is a video call, the third terminal device communicates with the calling party in a video call manner, and the calling party communicates with the third terminal device in a voice call manner.

The communications apparatus in this embodiment of this application may be configured to execute the technical solutions of the calling party in the foregoing method embodiments. An implementation principle and technical effects thereof are similar to those in the method embodiments, and details are not described herein again.

Figure 13:
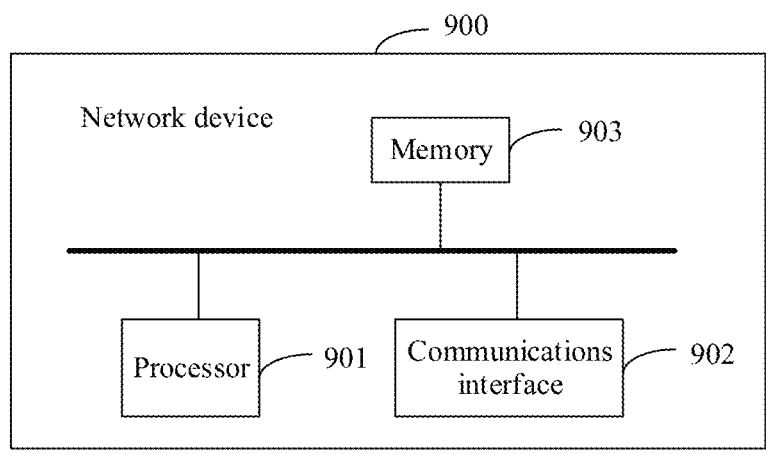
FIG. 13 is a schematic diagram of a structure of a network device according to an embodiment of this application.

FIG. 13 is a schematic diagram of a structure of a network device according to an embodiment of this application. A network device 900 may implement functions performed by the network device in the foregoing method embodiments. The functions may be implemented by hardware, or may be implemented by hardware by executing corresponding software. The hardware or software includes one or more modules or units corresponding to the functions.

In a possible design, a structure of the network device 900 includes a processor 901 and a communications interface 902, and the processor 901 is configured to support the network device 900 in performing a corresponding function in the foregoing methods. The communications interface 902 is configured to support communication between the network device 900 and another network element. The network device 900 may further include a memory 903. The memory 903 is configured to be coupled to the processor 901, and stores program instructions and data that are necessary for the network device 900.

A person skilled in the art may understand that for ease of description, FIG. 13 shows only one memory 903 and one processor 901. An actual network device 900 may have a plurality of processors 901 and a plurality of memories 903. The memory 903 may also be referred to as a storage medium, a storage device, or the like. This is not limited in this embodiment of this application.

The network device in this embodiment of this application may be configured to execute the technical solutions performed by the network device in the foregoing method embodiments. An implementation principle and technical effects thereof are similar, and details are not described herein again.

Figure 14:
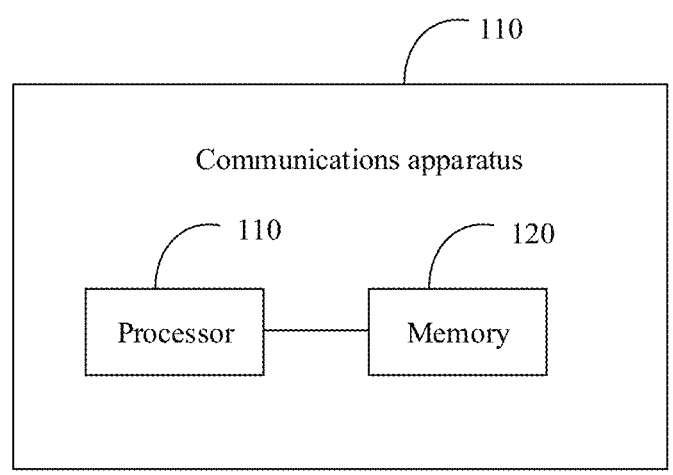
FIG. 14 is a schematic diagram of a structure of a communications apparatus according to an embodiment of this application.

FIG. 14 is a schematic diagram of a structure of a communications apparatus according to an embodiment of this application. A communications apparatus 100 exists in a product form of a chip. A structure of the communications apparatus includes a processor 110 and a memory 120. The memory 120 is configured to be coupled to the processor 110. The memory 120 stores program instructions and data that are necessary for the communications apparatus. The processor 110 is configured to execute the program instructions stored in the memory 120, so that the communications apparatus performs functions of the network device in the foregoing method embodiments.

The communications apparatus in this embodiment of this application may be configured to execute the technical solutions performed by the network device in the foregoing method embodiments. An implementation principle and technical effects thereof are similar, and details are not described herein again.

Figure 15:
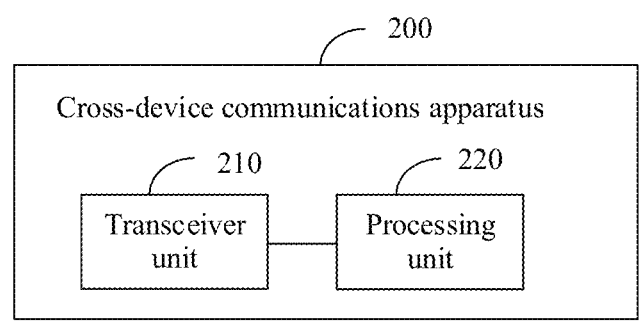
FIG. 15 is a schematic diagram of a structure of a cross-device communications apparatus according to an embodiment of this application.

FIG. 15 is a schematic diagram of a structure of a cross-device communications apparatus according to an embodiment of this application. The communications apparatus may be a network device, or may be a component (for example, an integrated circuit or a chip) of a network device. As shown in FIG. 15, a communications apparatus 200 may include a transceiver unit 210 and a processing unit 220.

The transceiver unit 210 is configured to receive a call request of a calling party, where the call request includes identification information of a called first terminal device.

The processing unit 220 is configured to call the first terminal device and at least one second terminal device based on the identification information of the first terminal device, where identification information of the first terminal device and the second terminal device has a correspondence with a same user account.

The transceiver unit 210 is further configured to: receive an answering instruction of a user, where the answering instruction is used to instruct a third terminal device to answer the call request, and the third terminal device is any one of the first terminal device and the at least one second terminal device; and send a call response to the calling party in response to the answering instruction, where the call response is used to indicate the third terminal device to establish communication with the calling party.

In a possible implementation, the processing unit 220 is specifically configured to obtain, based on the identification information of the first terminal device, the at least one second terminal device under the user account corresponding to the identification information of the first terminal device.

The transceiver unit 210 is specifically configured to send a call instruction to the first terminal device and the at least one second terminal device, where the call instruction is used to call the first terminal device and the at least one second terminal device.

In a possible implementation, the processing unit 220 is further configured to control the first terminal device to ring and the at least one second terminal device not to ring.

In a possible implementation, the processing unit 220 is specifically configured to control the transceiver unit 210 to send a first call instruction to the first terminal device, where the first call instruction includes first ringing indication information, and the first ringing indication information is used to indicate the first terminal device to ring when the first terminal device is called.

In a possible implementation, the processing unit 220 is specifically configured to control the transceiver unit 210 to send a second call instruction to the at least one second terminal device, where the second call instruction includes second ringing indication information, and the second ringing indication information is used to indicate the at least one second terminal device not to ring when the at least one second terminal device is called.

In a possible implementation, the transceiver unit 210 is further configured to send a hang-up indication to a terminal device other than the third terminal device in the first terminal device and the at least one second terminal device, where the hang-up indication indicates the terminal device to hang up a call of the network device.

In a possible implementation, the processing unit 220 is further configured to:

determine, based on a call function of the third terminal device, an answering manner in which the third terminal device answers the call request; and control the third terminal device to answer the call request in the determined answering manner.

Optionally, the call response includes the answering manner in which the third terminal device answers the call request.

In a possible implementation, a call function of the calling party is supporting a voice call and a video call. In this case, the processing unit 220 is specifically configured to: if a call manner of the call request is a video call, and the call function of the third terminal device is supporting a voice call and a video call, determine that the answering manner of the third terminal device is a voice call or a video call; if a call manner of the call request is a video call, and the call function of the third terminal device is supporting a voice call but not supporting a video call, determine that the answering manner of the third terminal device is a voice call; if a call manner of the call request is a voice call, and the call function of the third terminal device is supporting a voice call and a video call, determine that the answering manner of the third terminal device is a voice call or a video call; or if a call manner of the call request is a voice call, and the call function of the third terminal device is supporting a voice call but not supporting a video call, determine that the answering manner of the third terminal device is a voice call.

In a possible implementation, the processing unit 220 is further configured to determine a call manner between the third terminal device and the calling party based on the call manner of the call request and the answering manner of the third terminal device. The call response includes the call manner between the third terminal device and the calling party.

In some specific examples, the call function of the calling party is supporting a voice call and a video call.

The processing unit 220 is specifically configured to: if the call manner of the call request is a video call, and the answering manner of the third terminal device is a voice call, determine that the third terminal device communicates with the calling party in a voice call manner; if the call manner of the call request is a video call, and the answering manner of the third terminal device is a video call, determine that the third terminal device communicates with the calling party in a video call manner; if the call manner of the call request is a video call, and the answering manner of the third terminal device is a voice call, determine that the third terminal device communicates with the calling party in a voice call manner, and the calling party communicates with the third terminal device in a video call manner; if the call manner of the call request is a voice call, and the answering manner of the third terminal device is a voice call, determine that the third terminal device communicates with the calling party in a voice call manner; if the call manner of the call request is a voice call, and the answering manner of the third terminal device is a video call, determine that the third terminal device communicates with the calling party in a video call manner; or if the call manner of the call request is a voice call, and the answering manner of the third terminal device is a video call, determine that the third terminal device communicates with the calling party in a video call manner, and the calling party communicates with the third terminal device in a voice call manner.

Optionally, the answering instruction is voice information, or the answering instruction is a preset user gesture instruction.

The communications apparatus in this embodiment of this application may be configured to execute the technical solutions performed by the network device in the foregoing method embodiments. An implementation principle and technical effects thereof are similar, and details are not described herein again.

Figure 16:
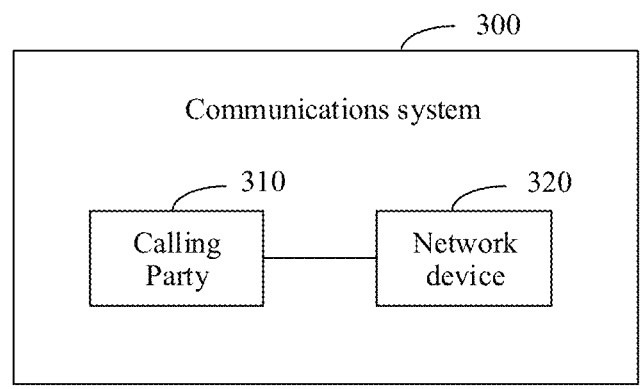
FIG. 16 is a schematic diagram of a structure of a communications system according to an embodiment of this application.

FIG. 16 is a schematic diagram of a structure of a communications system according to an embodiment of this application. As shown in FIG. 16, a communications system 300 in this embodiment of this application includes a calling party 310 and a network device 320.

The calling party 310 may be configured to implement functions of the calling party in the foregoing method embodiments, and the network device 320 may be configured to implement functions on the network device side in the foregoing method embodiments. An implementation principle and technical effects thereof are similar, and details are not described herein again.

Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by a person skilled in the art that, for convenient and brief description, for a detailed working process of the foregoing system, apparatus, and units, refer to a corresponding process in the foregoing method embodiments, and details are not described herein again. In addition, the method embodiments and the apparatus embodiments may also be mutually referenced. Same or corresponding content in different embodiments may be mutually cited, and details are not described again.

What is claimed is:

1. A cross-device communications method, applied to a wireless network, wherein the method comprises:
   receiving a call request of a calling party, wherein the call request comprises identification information of a called first terminal;
   calling the first terminal and a second terminal based on the identification information of the first terminal, wherein the identification information of the first terminal and identification information of the second terminal corresponds to a same user account, and wherein the first terminal rings and the second terminal does not ring;
   receiving, from the second terminal, an answering instruction of a user that indicates to the wireless network to route the call request to the second terminal to answer the call request; and
   sending a call response to the calling party in response to the answering instruction, the call response including a type of call supported by the second terminal.

2. The method according to claim 1, wherein calling the first terminal and the second terminal comprises:
   obtaining, based on the identification information of the first terminal, the second terminal corresponding to the user account; and
   sending a first call instruction to the first terminal and the second terminal, wherein the first call instruction is used to call the first terminal and the second terminal.

3. The method according to claim 1, wherein controlling the first terminal to ring comprises:
   sending a second call instruction to the first terminal, wherein the second call instruction comprises first ringing indication information that is used to indicate to the first terminal to ring when the first terminal is called.

4. The method according to claim 1, wherein controlling the second terminal to not ring comprises:
   sending a second call instruction to the second terminal, wherein the second call instruction comprises second ringing indication information used to indicate to the second terminal to not ring when the second terminal is called.

5. The method according to claim 1, wherein the method further comprises:
   controlling the second terminal to answer the call request according to the type of call that is supported by the second terminal.

6. The method according to claim 5, wherein the calling party can support a voice call and a video call, and determining the type of call between the second terminal and the calling party comprises:
   determining that the type of call between the second terminal and the calling party is the voice call when the second terminal supports the voice call but does not support the video call.

7. The method according to claim 1, wherein the method further comprises:
   determining a type of call between the second terminal and the calling party based on a type of call specified by the call request and the type of call that is supported by the second terminal.

8. A device of a wireless network, the device comprising:
   one or more processors;
   one or more memories; and
   one or more computer programs comprising instructions, wherein the one or more computer programs are stored in the one or more memories, and when the instructions are executed by the one or more processors, the device is enabled to:
   receive a call request of a calling party, wherein the call request comprises identification information of a called first terminal;
   call the first terminal and a second terminal based on the identification information of the first terminal, wherein the identification information of the first terminal and identification information of the second terminal corresponds to a same user account, and wherein the first terminal rings and the second terminal does not ring;

receive, from the second terminal, an answering instruction of a user that indicates to the wireless network to route the call request to the second terminal to answer the call request; and send a call response to the calling party in response to the answering instruction, the call response including a type of call that is supported by the second terminal.

9. The device of claim 8, wherein when the instructions are executed by the one or more processors, the device is further enabled to call the first terminal and the second terminal by:

obtaining, based on the identification information of the first terminal, the second terminal corresponding to the user account; and sending a first call instruction to the first terminal and the second terminal, wherein the first call instruction is used to call the first terminal and the second terminal.

10. The device of claim 8, wherein when the instructions are executed by the one or more processors, the device is further enabled to send a second call instruction to the first terminal, wherein the second call instruction comprises first ringing indication information that is used to indicate to the first terminal to ring when the first terminal is called.

11. The device of claim 8, wherein when the instructions are executed by the one or more processors, the device is further enabled to send a second call instruction to the second terminal, wherein the second call instruction comprises second ringing indication information used to indicate to the second terminal to not ring when the second terminal is called.

12. The device of claim 8, wherein when the instructions are executed by the one or more processors, the device is further enabled to control the second terminal to answer the call request according to the type of call that is supported by the second terminal.

13. The device of claim 8, wherein when the instructions are executed by the one or more processors, the device is further enabled to determining a type of call between the second terminal and the calling party based on a type of call specified by the call request and the type of call that is supported by the second terminal, wherein the call response comprises the type of call between the second terminal and the calling party.

14. A non-transitory computer-readable storage medium comprising:

instructions that when executed by one or more processors cause a device within a wireless network to:

receive a call request of a calling party, wherein the call request comprises identification information of a called first terminal;

call the first terminal and a second terminal based on the identification information of the first terminal, wherein the identification information of the first terminal and identification information of the second terminal corresponds to a same user account, and wherein the first terminal rings and the second terminal does not ring;

receive, from the second terminal, an answering instruction of a user that indicates to the device to route the call request to the second terminal to answer the call request; and send a call response to the calling party in response to the answering instruction, the call response including a type of call that is supported by the second terminal.

15. The non-transitory computer-readable storage medium of claim 14, wherein the instructions further cause the device to call the first terminal and the second terminal by:

obtaining, based on the identification information of the first terminal, the second terminal corresponding to the user account; and sending a first call instruction to the first terminal and the second terminal, wherein the first call instruction is used to call the first terminal and the second terminal.

16. The non-transitory computer-readable storage medium of claim 14, wherein the instructions further cause the device to send a second call instruction to the first terminal, wherein the second call instruction comprises first ringing indication information that is used to indicate to the first terminal to ring when the first terminal is called.

17. The non-transitory computer-readable storage medium of claim 14, wherein the instructions further cause the device to send a second call instruction to the second terminal, wherein the second call instruction comprises second ringing indication information used to indicate to the second terminal to not ring when the second terminal is called.

18. The non-transitory computer-readable storage medium of claim 14, wherein the instructions further cause the device to control the second terminal to answer the call request according to the type of call that is supported by the second terminal.

19. The non-transitory computer-readable storage medium of claim 14, wherein the instructions cause the device to determine a type of call between the second terminal and the calling party based on a type of call specified by the call request and the type of call that is supported by the second terminal, wherein the call response comprises the type of call between the second terminal and the calling party.

* * * * *